United States Patent [19]

Ucida

[11] Patent Number: 6,002,785
[45] Date of Patent: *Dec. 14, 1999

[54] TENPRINT CARD SELECTOR WITH FINGERPRINT PATTERN LEVEL PROCESSING USED TO SELECT CANDIDATES FOR SUB-PATTERN LEVEL PROCESSING

[75] Inventor: Kaoru Ucida, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/732,875

[22] Filed: Oct. 16, 1996

[30] Foreign Application Priority Data

Oct. 16, 1995 [JP] Japan .................................. 7-293620

[51] Int. Cl.$^6$ ...................................................... G06K 9/00
[52] U.S. Cl. .......................... 382/124; 382/116; 382/125; 382/126; 340/825.34
[58] Field of Search ..................................... 382/124, 125, 382/116, 126, 115; 340/825.34

[56] References Cited

U.S. PATENT DOCUMENTS

| | | | |
|---|---|---|---|
| 4,947,442 | 8/1990 | Tanaka et al. ................................ | 382/2 |
| 5,067,162 | 11/1991 | Driscoll, Jr. et al. ........................ | 382/4 |
| 5,073,949 | 12/1991 | Takeda et al. ................................ | 382/4 |
| 5,613,014 | 3/1997 | Eshera et al. ............................ | 382/124 |
| 5,659,626 | 8/1997 | Ort et al. .................................. | 382/124 |
| 5,717,786 | 2/1998 | Kamei ..................................... | 382/204 |

FOREIGN PATENT DOCUMENTS

| | | |
|---|---|---|
| 60-134386 | 7/1985 | Japan . |
| 5-108806 | 4/1993 | Japan . |

OTHER PUBLICATIONS

Shelman C.B.: "Fingerprint Classification—Theory and Application", pp. 131–138; May 1976.

C.V. Kameswara et al.: "An Automated Fingerprint Classification System", pp. 180–184; Aug. 1974.

"The Science of Fingerprints Classification and Uses", United States Department of Justice, pp. 4–5, 24 and 80–91, Dec. 1994.

Ito et al., "An Algorithm for Classification of Fingerprints Based on the Core" Collection of Paper by The Institute of Electronics, Information and Communication, Engineers, D–11, vol. J73–D11, No. 10, pp. 1733–1741, Oct. 1990.

Nakamura et al., Collection of Paper by Institute of Electronics and Communication Engineers of Japan, vol. J65–D, No. 10, pp. 1286–1293, Oct. 1982.

*Primary Examiner*—Christopher S. Kelley
*Assistant Examiner*—Sheela Chawan
*Attorney, Agent, or Firm*—Foley & Lardner

[57] ABSTRACT

A tenprint selector comprises a fingerprint pattern level feature difference calculating unit which receives and compares a set of candidates for pattern level feature types of fingerprint images shown on file cards and a set of candidates for pattern level feature types of fingerprint images shown on a search card and calculates a pattern level feature difference, a card difference calculating unit which calculates a card difference based on the pattern level feature difference of the fingerprint images of all fingers shown on the file cards and the search card, and a judging unit which compares the card difference determined by the card difference calculating means with a predetermined card difference threshold value and judges, whether the file card shall be selected to be further checked with the search card.

12 Claims, 9 Drawing Sheets

TENPRINT CARD SELECTOR WITH FINGERPRINT PATTERN LEVEL PROCESSING USED TO SELECT CANDIDATES FOR SUB-PATTERN LEVEL PROCESSING

BACKGROUNDS OF THE INVENTION

1. Field of the Invention

The present invention relates to a tenprint card selector which is used for a fingerprint matching device or the like for matching fingerprints with reference to tenprint cards showing fingerprints and selects a tenprint card corresponding to a sample from a plurality of tenprint card files based on a prescribed standard, and a tenprint card preselector which preselects tenprint cards to be checked by means of the tenprint card selector.

2. Description of the Related Art

When a fingerprint matching device which checks a fingerprint with reference to tenprint cards each having the record of applied fingerprints of ten fingers in a prescribed format is used to check a fingerprint, a tenprint card (hereinafter referred to as the search card) which shows newly collected fingerprint images is checked against the tenprint cards (hereinafter referred to as the file cards) which have the images of fingerprints collected previously in the above-described format and have been registered on a database in order to judge whether the file cards in a file include a file card which has the fingerprint images identical with those shown on the search card. The fingerprint matching device judges identity of the fingerprint images of corresponding fingers by matching the search card against all file cards in the files. Various types of methods have been proposed to judge identity of a given fingerprint image with one kept on record. The technology disclosed in Japanese Unexamined Patent Publication (Kokai) No. Showa 60-134386 "Fingerprint Checking Method" is one example of such fingerprint matching technologies.

But, the above matching method, which checks identity of the fingerprint image of each finger one by one, needs the same number of matching times same as the number of all file cards in the files at the maximum. The above-mentioned fingerprint matching device determines identity of given pair of fingers by attempting to match minutiae (bifurcations and end-points of ridges) positions. Therefore, the number of times that arithmetic for judging identity of fingerprint images is performed counts (file card numbers in files)× (average number of fingers subject to the judgment for identity of fingerprint images in matching the search card against one file card), requiring much computation time compared with a preselecting technology.

Conventionally, in order to decrease the computational complexity required for the above matching process, it has been proposed to employ a preselecting technology which previously reduces the number of file cards to be used for matching a search card based on a prescribed standard before performing the matching process. This type of preselecting technology generally detects the features of the general pattern of ridges (hereinafter referred to as the pattern level feature) from the fingerprint image of each finger between the file cards and the search card, compares the obtained features of the pattern level features, and selects the file cards having the features similar to those on the search card to compare with the search card.

To evaluate the preselecting performance of such a preselecting technology, it is necessary to consider two yardsticks, reliability and selectivity. Reliability means a probability of correct judgment as identical when the given search card and the file card are a match, i.e. they both show the fingerprint images collected from the same person. A value indicating reliability is desired to be high, and 100% is the best. Selectivity means a probability of misjudgment as identical when a non-match is given, i.e. images on the search and file cards are collected from different persons. A value indicating selectivity is desired to be lower and 0% is the best. When a value which indicates selectivity is low, it is expressed as "selectivity is high".

As the features of the pattern level feature to be used for preselecting, conventionally proposed various standards can be used. Examples of such classification standards are described in documents such as "Fingerprint Classification by Directional Distribution Patterns" (Osamu NAKAMURA et al., Collection of Paper by Institute of Electronics and Communication Engineers of Japan, Vol. J65-D, No. 10, pp. 1286–1293, October 1982), "An Algorithm for Classification of Fingerprints Based on the Core" (Shin' ichiro ITO et al., Collection of Paper by The Institute of Electronics, Information and Communication Engineers, D-II, Vol. J73-D-II, No. 10, pp. 1733–1741, October 1990), and "The Science of Fingerprints" (U.S. Department of Justice, Federal Bureau of Investigation). According to the above documents, the fingerprint images can be classified into whorls, left loops, right loops and arches (hereinafter referred to as the pattern level feature type) depending on the pattern level feature forms and the positional relation of singular points. And, "The Science of Fingerprints" describes a method of classifying by using a permutation of sub-pattern level information such as the number of ridges between the singular points of fingerprint patterns in addition to the pattern level feature type of each finger to perform more accurate preselecting.

The conventional fingerprint matching device, which utilizes the above pattern level feature type to preselect the file cards to be compared, prepares a list of the pattern level feature types corresponding to the fingerprint images of respective fingers and classifies the file cards. And, to check the tenprint cards, the list of the pattern level feature types obtained from the fingerprint images of respective fingers on the search card are compared with the one of the pattern level feature types on the file cards, and matching is performed on a group of the file cards which have the same list of pattern level feature types as that of the search card. FIG. 8 shows an example of configuration of the conventional tenprint card preselector for performing the above-described preselecting method.

In FIG. 8, a tenprint card preselector 100 receives the fingerprint images of file cards from an external image storage device 101, a fingerprint pattern level feature judging apparatus 105 judges the pattern level feature types of respective fingers on the respective file cards, classifies the file cards according to the list of the pattern level feature types of ten fingers, and a file card storage 103 stores the classified file cards. Then, upon receiving the fingerprint images shown on a search card from the external image storage device 101, a fingerprint pattern level feature judging apparatus 106 similarly judges the pattern level feature types of respective fingers on the search card, and determines as a preselecting result a group of the file cards which have the list of the pattern level feature types of ten fingers matching to that of the pattern level feature types of the judged search card.

But, the above conventional tenprint card preselector had disadvantages that the same lists of the pattern level feature types of ten fingers were often obtained and preselecting was not satisfactory.

And, when the file cards were classified according to the list of the pattern level feature types of ten fingers, classification was uniquely determined, so that ambiguity of the pattern level feature type could not be allowed, and the pattern level feature types might be misjudged. In other words, if a corresponding pattern level feature type could not be specified in connection with the fingerprint of a certain finger, a plurality of corresponding candidates were considered, and if such a situation took place on a plurality of fingers, preselecting could not be determined efficiently.

Besides, since the classification according to the list of the pattern level feature types of ten fingers is fixed, preselecting having desired characteristics and performance according to the tradeoff of the two yardsticks, reliability and selectivity, could not be achieved with flexibility.

And, in the case of classifying the file cards by utilizing the list using sub-pattern level information on sub-features such as the number of ridges between the singular points of fingerprint patterns in addition to the pattern level feature types of respective fingers, ambiguity of the pattern level feature types and sub-pattern level information could not be permitted. Therefore, there was a disadvantage that satisfactory preselecting could not be made.

SUMMARY OF THE INVENTION

A first object of the invention is to provide a tenprint card selector and a tenprint card preselector which, when judgment of pattern level feature types and detection of singular points of fingerprint patterns are automatically performed on the fingerprints of a plurality of fingers on a tenprint card, have flexibility of enhancing reliability and selectivity of card pairs to be checked and enabling to achieve preselecting having desired characteristics and performance according to the tradeoff of two yardsticks, reliability and selectivity, while allowing the possibility of containing unclassifiable judgment or misjudgment.

A second object of the invention is to provide a tenprint card selector and a tenprint card preselector which also utilize prescribed sub-pattern level information to expand a feature space, thereby achieving better selectivity and reliability.

A third object of the invention is to provide a tenprint card selector and a tenprint card preselector which consider a confidence rating for the pattern level features on pattern level feature types and a confidence rating for the sub-pattern level information on sub-pattern level information to enable calculation of a card difference weighed depending on the confidence rating for pattern level features and the confidence rating for sub-pattern level information and to further enhance reliability and selectivity.

According to the first aspect of the invention, a tenprint card selector for selecting tenprint cards, which have features similar to those of a sample, from a file having a plurality of tenprint cards comprising:

a fingerprint pattern level feature difference calculating means for receiving and comparing a set of candidates for pattern level feature types of fingerprint images shown on file cards and a set of candidates for pattern level feature types of fingerprint images shown on a search card and calculates a pattern level feature difference which shows the degree of similarity between said sets of candidates;

a card difference calculating means for calculating a card difference showing similarity of the features of the fingerprint images shown on said file cards and said search card based on said pattern level feature difference of the fingerprint images of all fingers shown on said file cards and said search card; and a judging means for comparing the card difference determined by said card difference calculating means with a predetermined card difference threshold value and judging whether said file card shall be selected to be further checked with said search card.

In the preferred construction, the fingerprint pattern level feature difference calculating means may be provided in multiple numbers to individually correspond to each finger and calculate a pattern level feature difference with respect to the fingerprint image of each corresponding finger.

In the preferred construction, when the comparison of the sets of candidates for the pattern level feature types of said file cards and said search card results in that both sets of candidates are quite same or at least either of the pattern level feature types is unclassifiable, that the sets of candidates do not have any common pattern level feature type, or that a plurality of candidates in the sets of candidates have the same pattern level feature types, said fingerprint pattern level feature difference calculating means determines the value of the pattern level feature difference to be a minimum value, a maximum value, or a value appropriately determined between said minimum and maximum values, and the card difference calculating means determines a sum of all the pattern level feature differences of the respective fingers calculated by said fingerprint pattern level feature difference calculating means as the card difference.

According to the second aspect of the invention, a tenprint card selector for selecting tenprint cards, which have features similar to those of a sample, from a file having a plurality of tenprint cards comprising:

a fingerprint pattern level feature difference calculating means for receiving and comparing pattern level feature types of fingerprint images shown on file cards and pattern level feature types of fingerprint images shown on a search card and calculates a pattern level feature difference to show whether or not said pattern level feature types are identical mutually;

a fingerprint sub-pattern level feature calculating means for receiving sub-pattern level information on the fingerprint images shown on said file cards and sub-pattern level information on the fingerprint images shown on said search card and calculating a sub-pattern level feature showing secondary features of said fingerprint images;

a fingerprint sub-pattern level feature difference calculating means for receiving and comparing the sub-pattern level feature of the file cards and the sub-pattern level features of the search card determined by said sub-pattern level feature calculating means and also receiving and referring to the pattern level feature types of the fingerprint images shown on said file cards and said search card, and calculating a sub-pattern level feature difference which shows the degree of similarity between said sub-pattern level features;

a card difference calculating means for calculating a card difference showing similarity of the features of the fingerprint images shown on said file cards and said search card based on said pattern level feature difference of the fingerprint images of all fingers shown on said file cards and said search card and said sub-pattern level feature difference of the fingerprint images of all fingers shown on said file cards and said search card; and a judging means for comparing the card difference determined by said card difference calculating means with a predetermined card difference threshold value and judging whether said file card shall be selected to be further checked with said search card.

In the preferred construction, the fingerprint pattern level feature difference calculating means may be provided in multiple numbers to individually relate to each finger and calculate a pattern level feature difference with respect to the fingerprint image of each related finger, the fingerprint sub-pattern level feature calculating means may be provided in multiple numbers to individually relate to each finger and calculate a sub-pattern level feature with respect to the fingerprint image of each related finger, and the fingerprint sub-pattern level feature difference calculating means may be provided in multiple numbers to individually relate to each finger and calculate a sub-pattern level feature difference with respect to the fingerprint image of each related finger.

In the preferred construction, when the comparison of the pattern level feature types of said file cards and said search card results in that both pattern level feature types are same or at least either of the pattern level feature types is unclassifiable, or that the pattern level feature types do not match, said fingerprint pattern level feature difference calculating means determines the value of the pattern level feature difference to be a minimum value, or a maximum value, the fingerprint sub-pattern level feature calculating means receives said sub-pattern level information containing position coordinates of the singular points in the fingerprint images on said file cards and said search card to calculate a distance between said singular points and determines it as the sub-pattern level feature, when the pattern level feature types of the fingerprint images on said file cards and the pattern level feature types of the fingerprint images on said search card are identical, the fingerprint sub-pattern level feature difference calculating means calculates said sub-pattern level feature difference based on the positional difference of the singular points which are sub-pattern level features according to a calculating formula determined according to said pattern level feature types, and the card difference calculating means determines a sum obtained by adding all the pattern level feature differences of the respective fingers calculated by said fingerprint pattern level feature difference calculating means and the sub-pattern level feature differences of the respective fingers obtained by said fingerprint sub-pattern level feature difference calculating means as the card difference.

In another preferred construction, when the comparison of the pattern level feature types of said file cards and said search card results in that both pattern level feature types are same or at least either of the pattern level feature types is unclassifiable, or that the pattern level feature types do not match, the fingerprint pattern level feature difference calculating means determines the value of the pattern level feature difference to be a minimum value, or a maximum value, the fingerprint sub-pattern level feature calculating means receives said sub-pattern level information containing position coordinates of the singular points on the fingerprint images of said file cards and said search card to calculate a distance between said singular points and determines it as the sub-pattern level feature, when the pattern level feature types of the fingerprint images on said file cards and the pattern level feature types of the fingerprint images on said search card are loops and identical, whorls and identical, or others, the fingerprint sub-pattern level feature difference calculating means determines (the absolute value of a difference between the core-to-delta distance of the file card and the core-to-delta distance of the search card—prescribed value), (average value of the absolute values of differences between six core-to-delta distances of the file cards and six core-to-delta distances of the search card—prescribed value), or a value "0" as the sub-pattern difference, and the card difference calculating means determines a sum obtained by adding all the pattern level feature differences of the respective fingers calculated by said fingerprint pattern level feature difference calculating means and the sub-pattern level feature differences of the respective fingers obtained by said fingerprint sub-pattern level feature difference calculating means as the card difference.

In another preferred construction, the fingerprint pattern level feature difference calculating means may receive the pattern level feature types of the fingerprint images of said file cards and said search card and receives the pattern level feature confidence rating to insure the correctness of the pattern level feature types of the fingerprint images of said file cards and said search card, and determine a product of a pattern level feature confidence rating of the fingerprint images of said file cards and a pattern level feature confidence rating of the fingerprint images of said search card as a magnitude and a value with its code reversed as the pattern level feature difference when the pattern level feature types of the fingerprint images of said file cards and the pattern level feature types of the fingerprint images of said search card are identical, determine a product of a pattern level feature confidence rating of the fingerprint images of said file cards and a pattern level feature confidence rating of the fingerprint images of said search card as the pattern level feature difference when the pattern level feature types of the fingerprint images of said file cards and the pattern level feature types of the fingerprint images of said search card do not match, and determines the value "0" as the pattern level feature difference when at least either of the pattern level feature types is unclassifiable;

the fingerprint sub-pattern calculating means may receive said sub-pattern level information containing position coordinates of the singular points on the fingerprint images of said file cards and said search card, and also receive the pattern level feature types of the fingerprint images of said file cards and said search card and the sub-pattern level information confidence rating to insure the correctness of the sub-pattern level information concerning the fingerprint images of said file cards and said search card, and calculate the distance between singular points to determine as the sub-pattern level feature and calculates a sub-pattern level feature confidence rating product by multiplying the sub-pattern level information confidence rating concerning the singular points used to calculate said sub-pattern level feature;

the fingerprint sub-pattern level feature difference calculating means, when the pattern level feature types of the fingerprint images on said file cards and the pattern level feature types of the fingerprint images on the search card are loops and identical, whorls and identical, or others, determines (a value obtained by multiplying the absolute value of a difference between the core-to-delta distance of the file cards and the core-to-delta distance of the search card by a sub-pattern level feature confidence rating product—prescribed value), (average value obtained by multiplying the absolute values of differences between six core-to-delta distances of the file cards and six core-to-delta distances of the search card by the sub-pattern level feature confidence rating product—prescribed value), or a value "0" as the sub-pattern level feature difference; and the card difference calculating means calculates a first calculation value which is a sum of the pattern level feature differences of the respective fingers obtained by said fingerprint pattern level feature difference calculating means and a second calculation value which is a quotient obtained by dividing a sum of the sub-pattern level feature differences of the respective fingers obtained by said fingerprint sub-pattern level feature difference calculating means by a sum of the sub-pattern level feature confidence rating products of the respective fingers obtained by said fingerprint sub-pattern level feature difference calculating means, and determines a sum of said first calculation value and said second calculation value as the card difference.

According to the third aspect of the invention, a tenprint card preselector for preselecting tenprint cards which are to be compared by selecting the ten pin cards having features similar to those of a sample from a file containing a plurality of tenprint cards before matching fingerprints by using the tenprint cards, comprising:

a first fingerprint pattern judging means for detecting the candidates for pattern level feature types which are applicable to fingerprint images of respective fingers collected on file cards and producing a set of candidates;

a second fingerprint pattern level feature judging means for detecting the candidates for pattern level feature types which are applicable to fingerprint images of respective fingers collected on a search card and producing a set of candidates; and a tenprint card selecting means for receiving the set of candidates for the pattern level feature types for one card each from said first fingerprint pattern level feature judging means and said second fingerprint pattern level feature judging means and selecting the file cards which are to be compared with the search card;

said tenprint card selecting means comprising:

a fingerprint pattern level feature difference calculating means for receiving and comparing a set of candidates for pattern level feature types of fingerprint images on said file cards produced by said first fingerprint pattern level feature judging means and a set of candidates for pattern level feature types of fingerprint images on said search card produced by said second fingerprint pattern level feature judging means and calculating a pattern level feature difference to show the degree of similarity between said sets of candidates, a card difference calculating means for calculating a card difference showing similarity of the features of the fingerprint images shown on said file cards and said search card based on said pattern level feature difference of the fingerprint images of all fingers shown on said file cards and said search card, and a judging means for comparing the card difference determined by said card difference calculating means with a predetermined card difference threshold value and judging whether said file card shall be selected to be further checked with said search card.

In the preferred construction, when the comparison of the sets of candidates for the pattern level feature types of said file cards and said search card results in that both sets of candidates are quite same or at least either of the pattern level feature types is unidentified, that the sets of candidates do not have any common pattern level feature type, or that a plurality of candidates in the sets of candidates have the same pattern level feature types, the fingerprint pattern level feature difference calculating means determines the value of the pattern level feature difference to be a minimum value, a maximum value, or a value appropriately determined between said minimum and maximum values, and the card difference calculating means determines a sum of all the pattern level feature differences of the respective fingers calculated by said fingerprint pattern level feature difference calculating means as the card difference.

According to the fourth aspect of the invention, a tenprint card preselector for preselecting tenprint cards which are to be compared by selecting the ten pin cards having features similar to those of a sample from a file containing a plurality of tenprint cards before matching fingerprints by using the tenprint cards, comprising:

a first fingerprint pattern level feature judging means for judging applicable pattern level feature types with respect to fingerprint images of respective fingers collected on file cards;

a first sub-pattern level feature detecting means for detecting sub-pattern level information of said fingerprint images based on the fingerprint images of respective fingers collected on said file cards, a second fingerprint pattern level feature judging means for detecting candidates for applicable pattern level feature types with respect to fingerprint images of respective fingers collected on a search card and producing a set of candidates, a second sub-pattern level feature detecting means for detecting sub-pattern level information of said fingerprint images based on the fingerprint images of respective fingers collected on said search card; and a tenprint card selecting means for receiving the set of candidates for the pattern level feature types for one card each from said first fingerprint pattern level feature judging means and said second fingerprint pattern level feature judging means, receiving said sub-pattern level information of tenprint cards corresponding to the set of candidates received from said first sub-pattern level feature detecting means and said second sub-pattern level feature detecting means, and selecting the file cards which are to be compared with the search card;

said tenprint card selecting means comprising:

a fingerprint pattern level feature difference calculating means for receiving and comparing pattern level feature types of fingerprint images on said file cards judged by said first fingerprint pattern level feature judging means and pattern level feature types of fingerprint images on said search card judged by said second fingerprint pattern level feature judging means and calculating a pattern level feature difference to show whether or not said pattern level feature types are identical mutually, a fingerprint sub-pattern level feature calculating means for receiving sub-pattern level information on the fingerprint images shown on said file cards and sub-pattern level information on the fingerprint images shown on said search card and calculating a sub-pattern level feature showing secondary features of said fingerprint images, a fingerprint sub-pattern level feature difference calculating means for receiving and comparing the sub-pattern level feature of the file cards and the sub-pattern level feature of the search card determined by said fingerprint sub-pattern level feature calculating means and also receiving and referring to the pattern level feature types of the fingerprint images shown on said file cards and said search card, and calculating a sub-pattern level feature difference which shows the degree of similarity between said sub-pattern level features mutually, a card difference calculating means for calculating a card difference showing similarity of the features of the fingerprint images shown on said file cards and said search card based on said pattern level feature difference of the fingerprint images of all fingers shown on said file cards and said search card and said sub-pattern level feature difference of the fingerprint images of all fingers shown on said file cards and said search card, and a judging means for comparing the card difference determined by said card difference calculating means with a predetermined card difference threshold value and judging whether said file card shall be selected to be further checked with said search card.

In the preferred construction, when the comparison of the pattern level feature types of said file cards and said search card results in that both pattern level feature types are identical or at least either of the pattern level feature types is unclassifiable, or that the pattern level feature types do not match, said fingerprint pattern level feature difference calculating means determines the value of the pattern level feature difference to be a minimum value, or a maximum value, the said fingerprint sub-pattern level feature calculating means receives said sub-pattern level information containing a position coordinate of the singular points on the fingerprint images of said file cards and said search card to calculate a distance between said singular points and determines it as the sub-pattern level feature, when the pattern level feature types of the fingerprint images on said file cards and the pattern level feature types of the fingerprint images on the search card are identical, the fingerprint sub-pattern level feature difference calculating means calculates said sub-pattern level feature difference based on the positional difference of singular points which are sub-pattern level features according to a calculating formula determined according to said pattern level feature types, and the card difference calculating means determines a sum obtained by adding all the pattern level feature differences of the respective fingers calculated by said fingerprint pattern level feature difference calculating means and the sub-pattern level feature differences of the respective fingers obtained by said fingerprint sub-pattern level feature difference calculating means as the card difference.

In another preferred construction, when the comparison of the pattern level feature types of said file cards and said search card results in that both pattern level feature types are identical or at least either of the pattern level feature types is unclassifiable, or that the pattern level feature types do not match, the fingerprint pattern level feature difference calculating means determines the value of the pattern level feature difference to be a minimum value, or a maximum value, the fingerprint sub-pattern level feature calculating means receives said sub-pattern level information containing a position coordinate of the singular points on the fingerprint images of said file cards and said search card to calculate a distance between said singular points and determines it as the sub-pattern level feature, when the pattern level feature types of the fingerprint images on said file cards and the pattern level feature types of the fingerprint images on the search card are loops and identical, whorls and identical, or others, the fingerprint pattern level feature difference calculating means determines (the absolute value of a difference between the core-to-delta distance of the file cards and the core-to-delta distance of the search card—prescribed value), (average value of the absolute values of differences between six core-to-delta distances of the file cards and six core-to-delta distances of the search card—prescribed value), or a value "0" as the sub-pattern level feature difference, and the card difference calculating means determines a sum obtained by adding all the pattern level feature differences of the respective fingers calculated by said fingerprint pattern level feature difference calculating means and the sub-pattern level feature differences of the respective fingers obtained by said fingerprint sub-pattern level feature difference calculating means as the card difference.

In another preferred construction, the fingerprint pattern level feature difference calculating means receives the pattern level feature types of the fingerprint images of said file cards and said search card and receives the pattern level feature confidence rating to insure the correctness of the pattern level feature types of the fingerprint images of said file cards and said search card, and determines a product of a pattern level feature confidence rating of the fingerprint images of said file cards and a pattern level feature confidence rating of the fingerprint images of said search card as a magnitude and a value with its code reversed as the pattern level feature difference when the pattern level feature types of the fingerprint images of said file cards and the pattern level feature types of the fingerprint images of said search card are identical, determines a product of a pattern level feature confidence rating of the fingerprint images of said file cards and a pattern level feature confidence rating of the fingerprint images of said search card as the pattern level feature difference when the pattern level feature types of the fingerprint images of said file cards and the pattern level feature types of the fingerprint images of said search card do not match, and determines the value "0" as the pattern level feature difference when at least either of the pattern level feature types is unclassifiable;

the fingerprint sub-pattern calculating means receives said sub-pattern level information containing position coordinates of the singular points on the fingerprint images of said file cards and said search card, and also receives the pattern level feature types of the fingerprint images of said file cards and said search card and the sub-pattern level information confidence rating to insure the correctness of the sub-pattern level information concerning the fingerprint images of said file cards and said search card, and calculates said distance between singular points to determine as the sub-pattern level feature and calculates a sub-pattern level feature confidence rating product by multiplying the sub-pattern level information confidence rating concerning the singular points used to calculate said sub-pattern level feature;

the fingerprint sub-pattern level feature difference calculating means, when the pattern level feature types of the fingerprint images on said file cards and the pattern level feature types of the fingerprint images on the search card are loops and identical, whorls and identical, or others, determines (a value obtained by multiplying the absolute value of a difference between the core-to-delta distance of the file cards and the core-to-delta distance of the search card by a sub-pattern level feature confidence rating product—prescribed value), (average value obtained by multiplying the absolute values of differences between six core-to-delta distances of the file cards and six core-to-delta distances of the search card by the sub-pattern level feature confidence rating product—prescribed value), or a value "0" as the sub-pattern level feature difference; and the card difference calculating means calculates a first calculation value which is a sum of the pattern level feature differences of the respective fingers obtained by said fingerprint pattern level feature difference calculating means and a second calculation value which is a quotient obtained by dividing a sum of the sub-pattern level feature differences of the respective fingers obtained by said fingerprint sub-pattern level feature difference calculating means by a sum of the sub-pattern level feature confidence rating products of the respective fingers obtained by said fingerprint sub-pattern level feature difference calculating means, and determines a sum of said first calculation value and said second calculation value as the card difference.

Other objects, characteristics and effects of the present invention will be apparent from the following description to be made in detail.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

Preferred embodiments of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
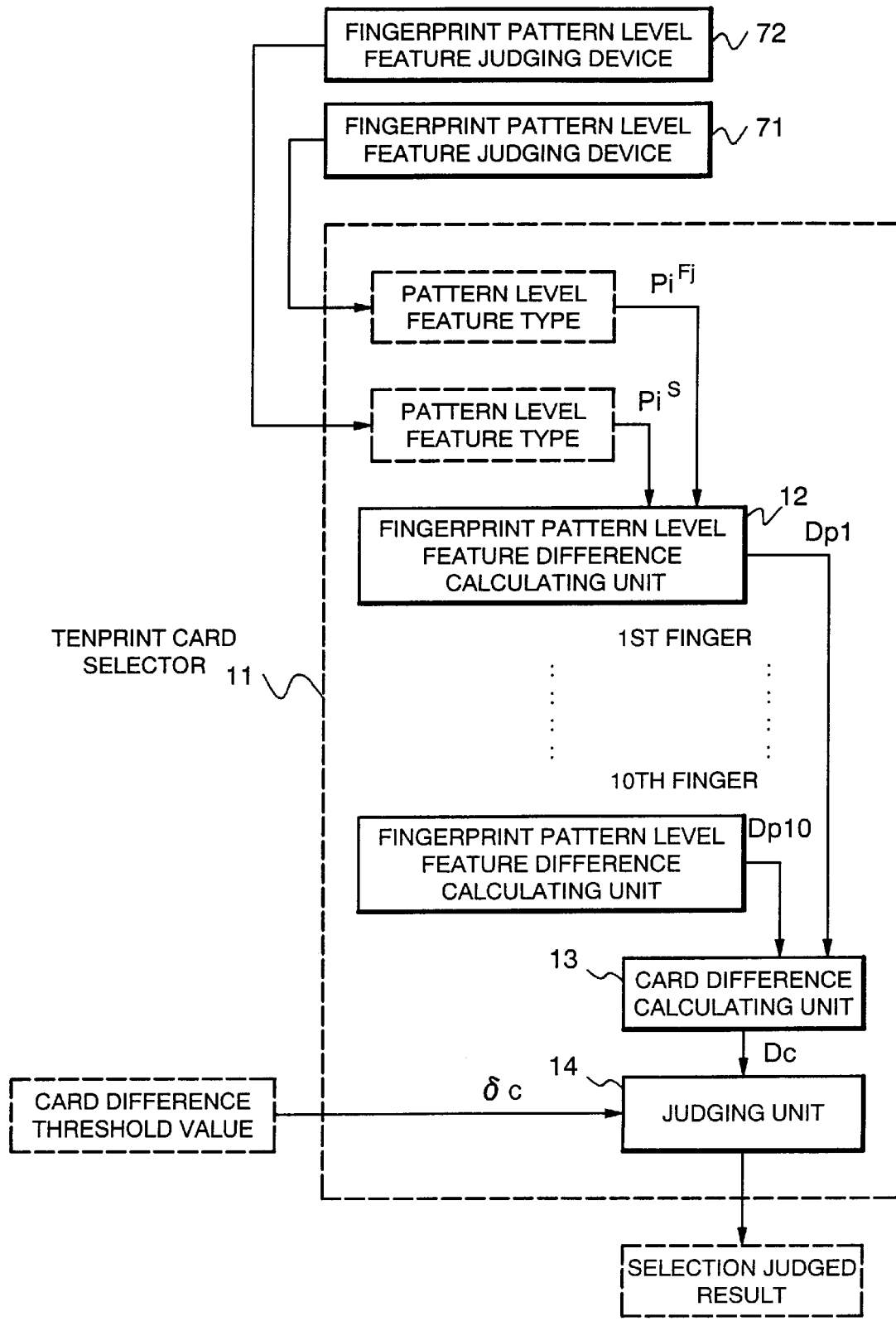
FIG. 1 is a block diagram showing a configuration of the tenprint card selector according to the first embodiment of the invention.
Figure 2:
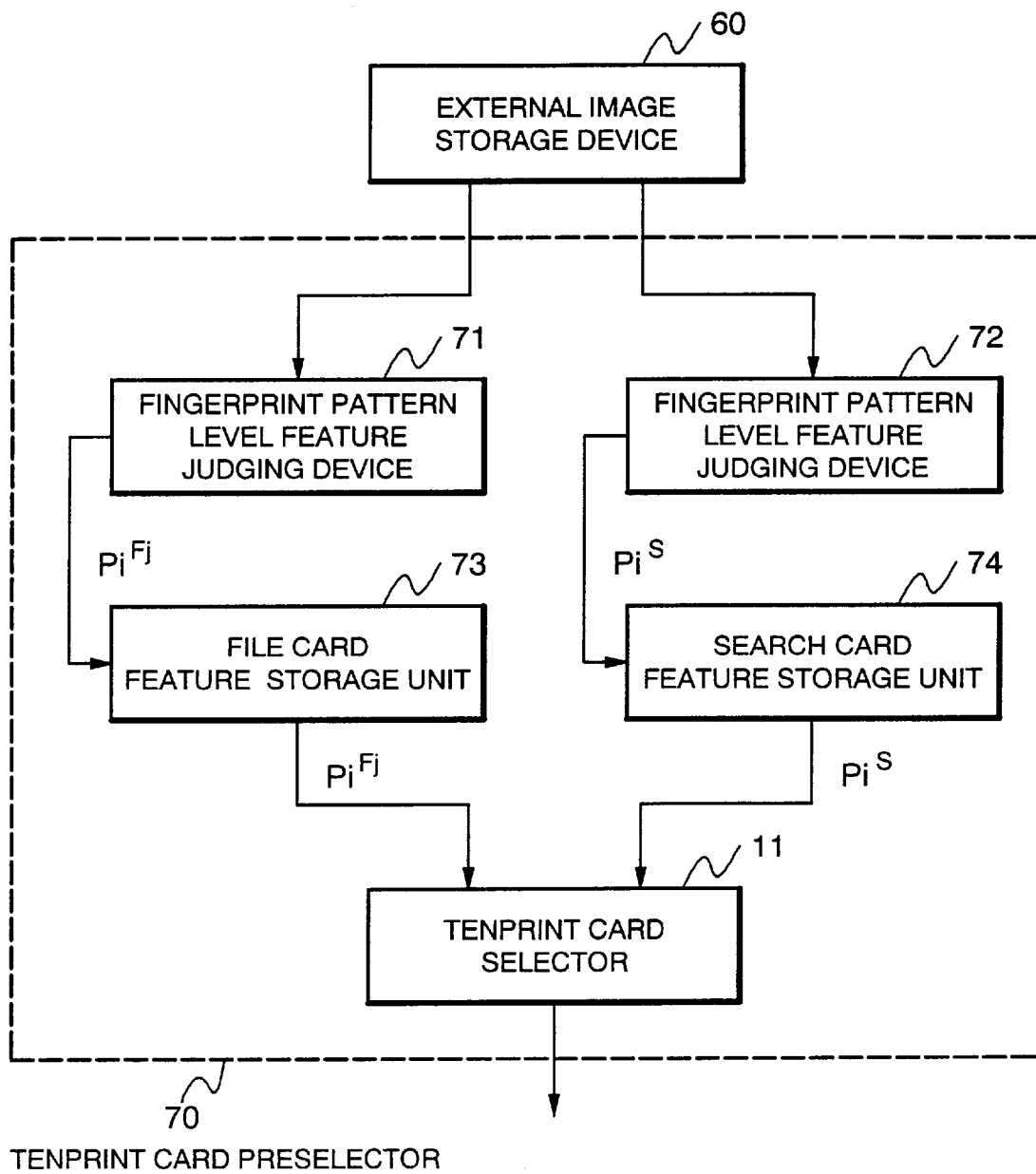
FIG. 2 is a block diagram showing a configuration of a tenprint card preselector provided with the tenprint card selector of the first embodiment.

FIG. 1 is a block diagram showing the configuration of a tenprint card selector 11 according to the first embodiment of the invention. FIG. 2 is a block diagram showing a configuration of a tenprint card preselector provided with the tenprint card selector 11 of the first embodiment shown in FIG. 1.

In the following description, it is assumed that tenprint cards including file cards and a search card have fingerprint images of ten fingers, and selection and preselection use information on N (=10) fingerprint images. And, the number of file cards accumulated in a file is determined to be M.

As shown in FIG. 1, the tenprint card selector 11 of the first embodiment comprises a fingerprint pattern level feature difference calculating unit 12 which receives a set of candidates for pattern level feature types of fingerprint images on file cards and a search card and determines a difference in a set of candidates for the pattern level features of each finger, a card difference calculating unit 13 which determines the whole difference between the applicable file cards and the search card based on the calculated results by the fingerprint pattern level feature difference calculating unit 12, and a judging unit 14 for judging whether or not the file cards shall be selected as the objects to be compared, based on the calculated result by the card difference calculating unit 13. And, as shown in FIG. 2, a tenprint card preselector 70 provided with the tenprint card selector 11 comprises a fingerprint pattern level feature judging device 71 which receives the fingerprint images of respective fingers on the file cards and determines a set of candidates for pattern level feature types, a fingerprint pattern level feature judging device 72 which receives the fingerprint images of respective fingers of the search card and determines a set of candidates for pattern level feature types, a file card feature storage unit 73 which stores the set of candidates for the pattern level feature types of the respective fingers on the file cards which are the judged result by the fingerprint pattern level feature judging device 71, a search card feature storage unit 74 which stores the set of candidates for the pattern level feature types of the respective fingers on the search card which are the judged result by the fingerprint pattern level feature judging device 72, and the tenprint card selector 11.

The fingerprint pattern level feature judging device 71 detects candidates for applicable pattern level feature types with respect to the fingerprint images of respective fingers collected on the file cards. The fingerprint pattern level feature judging device 72 detects candidates for applicable pattern level feature types with respect to the fingerprint images of respective fingers collected on the search card and prepares a set of candidates. As the fingerprint pattern level feature judging devices 71, 72, conventionally used various devices can be used. A device usable as such a device is described in, for example, Japanese Patent Application No. Heisei 7-197711 "Skin Pattern and Fingerprint Pattern Classifying Device". Now, the above-described classifying device will be described briefly below.

Figure 9:
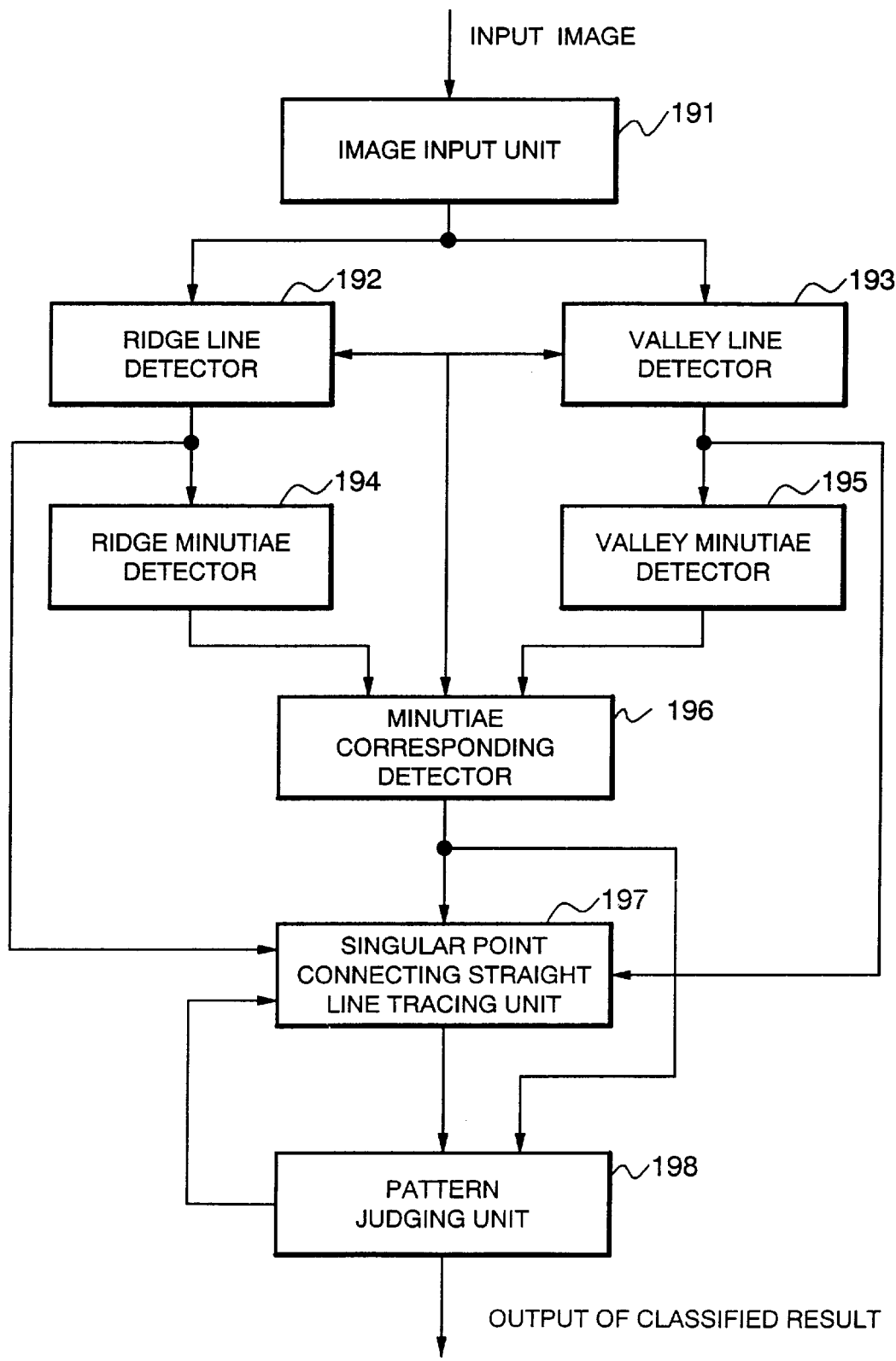
FIG. 9 is a block diagram showing a configuration example of a fingerprint pattern level feature judging apparatus.

FIG. 9 is a block diagram showing a configuration of the above skin pattern classifying device in the form of operation process. This skin pattern classifying device comprises an image input unit 191 for receiving a skin image prepared by imaging processing, a ridge line detector 192 for detecting ridge lines corresponding to ridges of the skin patterns in view of the skin image, a valley line detector 193 for detecting valley lines which are valley parts between the ridges of the skin patterns, a ridge minutiae detector 194 for detecting ridge minutiae from ridge lines, a valley minutiae detector 195 for detecting valley minutiae from valley lines, a minutiae corresponding detector 196 for determining the corresponding relation between ridge minutiae and valley minutiae by using the ridge line, valley line, ridge minutiae and valley minutiae, a singular point connecting straight line tracing unit 197 for tracing the straight lines connecting singular points of the skin patterns based on the descriptive information on the minutiae corresponding relation and the ridge line and valley line, and a pattern judging unit 198 for judging the skin pattern types by using the features of singular lines and the descriptive information.

The skin pattern classifying device and the fingerprint pattern level feature judging devices 71, 72 which can be achieved by another device, when the fingerprint image of a finger is given, produces a set of candidates for the ranked pattern level features resulting from the main classification judgment of one or multiple of the pattern level feature types such as whorls, left loops, right loops and arches depending on the positional relation of the singular points and general pattern shapes of the ridge patterns. If the pattern level feature types cannot be determined because of poor quality of fingerprint images, the main classification judgment result "unclassifiable" is outputted.

The file card feature storage unit 73 and the search card feature storage unit 74 are achieved by a memory such as RAM, retain the set of candidates for the pattern level feature types of the fingerprint images obtained by the fingerprint pattern level feature judging devices 71, 72 and supply the set of candidates for the pattern level feature types of the file cards for a single card and the set of candidates for the pattern level feature types of the search card according to the requirement of the tenprint card selector 11.

The fingerprint pattern level feature difference calculating unit 12, which is one of the units configuring the tenprint card selector 11, can be implemented using a program-controlled processor or the like, and as shown in FIG. 1, provided in a total number of N (=10) for each finger, and compares the pattern level features of the fingerprint images of the file cards and the search card about corresponded fingers. Specifically, the fingerprint pattern level feature difference calculating unit 12 which is related to an i (1<=i<=N) finger compares the set of candidates for a pattern level feature type $pi^{Fi}$ (j=1, ..., M) of the fingerprint image of the i-th finger on the file cards and the set of candidates for a pattern level feature type $Pi^S$ of the fingerprint image of the i-th finger of the search card to calculate a pattern level feature difference $D_{Pi}$. The pattern level feature difference $D_{pi}$ here has its value determined according to the number of candidates which are identical between the file cards and the search card among the set of candidates for the pattern level feature types given to the fingerprint image of the applicable finger. For example, the difference can be judged separately for a case that all candidates are identical, a case that some candidates are identical, and a case that no candidate is identical. When the calculated results are outputted from all the fingerprint pattern level feature difference calculating units 12, N numbers of pattern level feature differences $D_{Pi}$ are obtained.

The card difference calculating unit 13 is achieved by a program-controlled CPU or the like and calculates a card difference Dc between the file cards and the search card based on the N numbers of pattern level feature differences $D_{Pi}$ outputted from the fingerprint pattern level feature difference calculating units 12. The card difference Dc is a sum of all pattern level feature differences $D_{Pi}$, namely $\Sigma D_{Pi}$.

The judging unit 14 is achieved by a program-controlled CPU or the like and compares the card difference Dc determined by the card difference calculating unit 13 and a predetermined card difference threshold value δ c to determine whether or not the applicable file cards shall be selected as the object to be compared with the applicable search card.

Now, the operation of the above-configured tenprint card selector 11 of the first embodiment will be described together with the operation of the tenprint card preselector 70 provided with the tenprint card selector 11.

Figure 3:
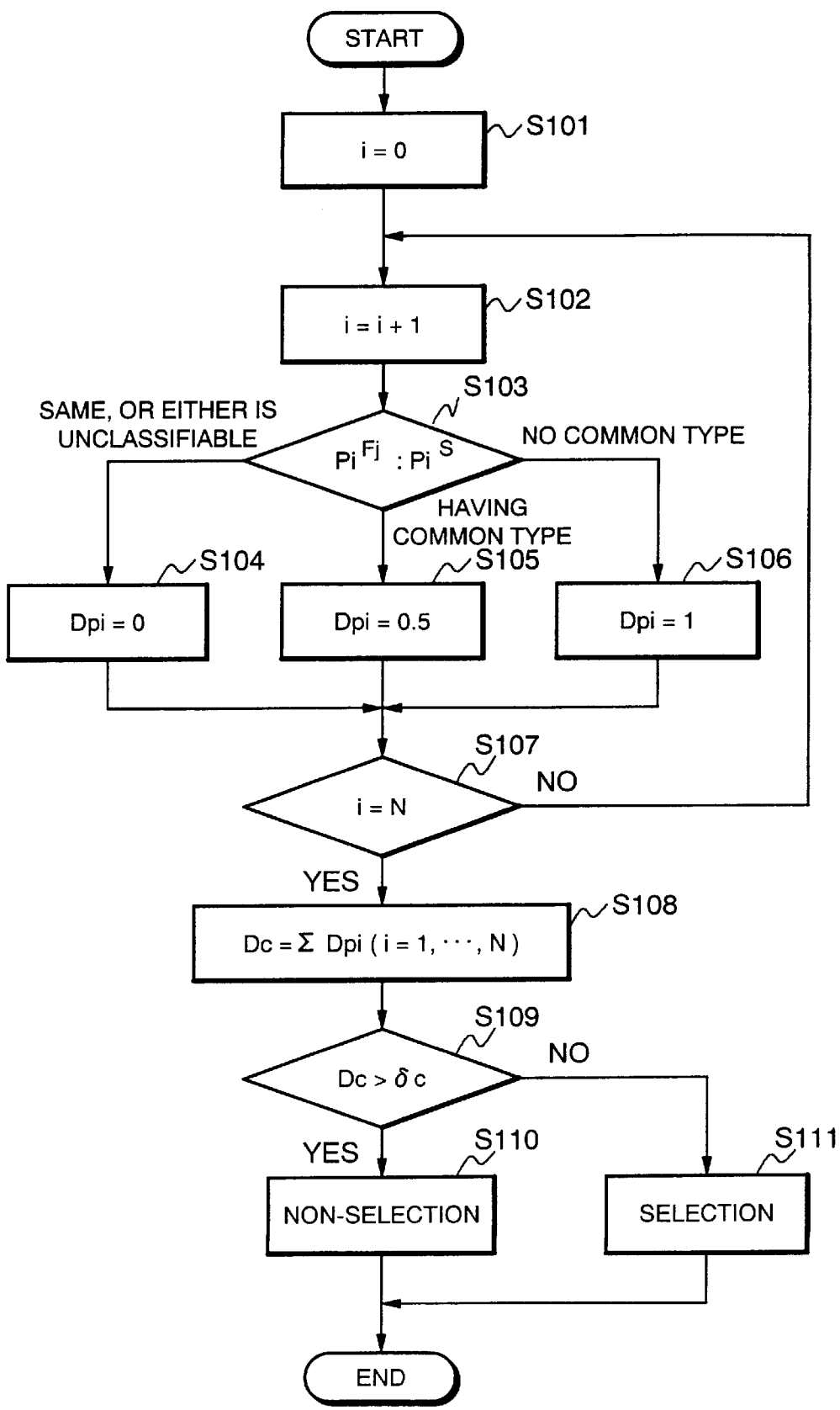
FIG. 3 is a flowchart showing a process by the tenprint card selector of the first embodiment.

Referring to the flowchart shown in FIG. 3, the process by the tenprint card selector 11 in the first embodiment includes a finger index initializing step S101, a finger parameter increment step S102, a pattern level feature type comparing step S103, a pattern level feature difference 0 setting step S104, a pattern level feature difference 0.5 setting step S105, a pattern level feature difference 1 setting step S106, a finger parameter end judging step S107, a card difference calculating step S108, a card difference/card difference threshold value comparing step S109, a non-selection decision step S110, and a selection decision step S111.

As the initial operation, the fingerprint pattern level feature judging device 71 in the tenprint card preselector 70 first obtains the fingerprint images of N fingers respectively shown on all the file cards (M numbers) stored in the external image storage device 60 or the like. And, the set of candidates for the pattern level feature type $Pi^{Fj}$ are produced and stored in the file card feature storage unit 73.

When the fingerprint images of respective fingers on a given search card are given to check whether a tenprint card having the same fingerprint images is included in the database of file cards, the fingerprint pattern level feature judging device 72 obtains the fingerprint images of respective fingers on the applicable search card stored in the external image storage device 60 or the like and produces the set of candidates for the pattern level feature type $Pi^S$. And, the set of candidates for the obtained pattern level feature type $Pi^S$ are stored in the search card feature storage unit 74. The search card feature storage unit 74 continuously sends the set of candidates for the applicable pattern level feature type $Pi^S$ to the tenprint card selector 11 while the matching process on the applicable search card is being performed.

In the preselecting process of the file cards to be compared by the tenprint card selector 11, the set of candidates for the pattern level feature type $Pi^{Fj}$ of the file cards stored in the file card feature storage unit 73 are sequentially sent one by one to the tenprint card selector 11, and the set of candidates for the pattern level feature type $Pi^{Fi}$ of the applicable file cards and the set of candidates for the pattern level feature $Pi^S$ of the search card are used to perform the process to be described below.

In the tenprint card selector 11, with the fingerprint image of the first finger shown on the first one among the file cards and the search card as the object, the fingerprint pattern level feature difference calculating unit 12 relevant to the first finger compares the set of candidates for the pattern level feature type $Pi^{Fj}$ of the file cards with the set of candidates for the pattern level feature $Pi^S$ of the search card (step S103). As a result of the comparison, when both sets of candidates are very similar, or at least either of the pattern level feature types is "unclassifiable", the value of the pattern level feature difference $D_{P1}$ is determined to be "0" (step S104). Among a plurality of candidates in the set of candidates, if the same pattern level feature types are contained in both of them, the value of the pattern level feature difference $D_{P1}$ is determined to be "0.5" (step S105). If the sets of candidates do not have any common pattern level feature type, the value of the pattern level feature difference $D_{P1}$ is determined to be "1" (step S106). And, the pattern level feature difference $D_{P1}$ obtained as described above is outputted to the card difference calculating unit 13. In the same way, the fingerprint pattern level feature difference calculating units 12 relevant to the 2nd finger to the Nth finger with the fingerprint images of the relevant fingers shown on the first one among the file cards and the search card as the object, determine the pattern level feature difference $D_{Pi}$ and output to the card difference calculating unit 13.

The card difference calculating unit 13 reads the pattern level feature difference $D_{Pi}$ outputted from the fingerprint pattern level feature difference calculating units 12 relevant to respective fingers to determine a card difference Dc (=$\Sigma D_{Pi}$) and outputs to the judging unit 14 (step S108).

The judging unit 14 compares the card difference Dc and a predetermined card difference threshold value $\delta$ c (step S109), and if the card difference Dc is larger than the card difference threshold value $\delta$ c, the judged result on the pertinent file card is determined to be "non-selection", meaning the file card should not be sent to the fingerprint matching device for further minutiae matching (step S110), and if not, it is judged necessary to check, and the judged result on the applicable file cards is determined to be "selection" (step S111). The value of the card difference threshold value $\delta$ c can be determined as desired according to the accuracy of the tenprint card selection unit required or the like. And, this operation example has performed judgment according to whether the card difference Dc is larger than the card difference threshold value $\delta$ c, but it may be made according to whether the card difference Dc is larger then the card difference threshold value $\delta$ c or equal to the applicable card difference threshold value $\delta$ c.

At this time, when the fingerprint images of the given file card and the search card are collected from the same person, i.e. the pair is a match, the fingerprint images should have the set of candidates for the same pattern level feature types, and when the fingerprint pattern level feature judging devices 71, 72 operate with high accuracy, the card difference Dc becomes small. Therefore, the judged result on this file card becomes "selection". Thus, selecting reliability is secured. on the other hand, when the fingerprint images of the file card and the search card are collected from different persons, i.e. the pair is a non-match, the probability of a set of candidates for different pattern level feature types is high, and the card difference Dc becomes large. Therefore, among the M numbers of file cards, the number of file cards to be judged as "selection" is decreased, and high selectivity is achieved. As described above, the computational complexity required for the above judgment is extremely small as compared with the case of minutiae matching.

Then, the same selecting process is performed on the 2nd to Mth file cards. Thus, the judged result on the limited number of file cards which are determined with the card difference threshold value $\delta$ c among the file cards as the standard is determined to be "selection", and the preselection of the file cards subject to the comparison with the search card is performed. When the card difference threshold value $\delta$ c is generally determined to be a large value, the card selecting reliability is enhanced, while selectivity is degraded. And, when it is determined to be a small value, reliability is lowered, but selectivity is improved. Therefore, the tradeoff of such yardsticks is evaluated and decided by preliminary experiments.

When it is judged to be "selection", the applicable file cards are outputted as the processed result by the tenprint card preselector and used for the matching process by the fingerprint matching device. The fingerprint matching device compares the fingerprint images of file cards with those of the search card on each finger to inspect whether the cards really have the same fingerprint images.

In the tenprint card selector 11, the fingerprint pattern level feature difference calculating unit 12 gives one of three values "0", "0.5" and "1" to the pattern level feature difference $D_{Pi}$ according to the compared result between the set of candidates for the pattern level feature type $Pi^{Fj}$ of the file cards and the set of candidates for the pattern level feature type $Pi^S$ of the search card, but when there is a tendency of many judgment errors on a certain pattern level feature type according to the characteristics of the fingerprint pattern level feature judging devices 71, 72, much more values are determined by reflecting such tendency, and selection may be made according to the pattern level feature types, and consecutive values calculated by a prescribed function can be given.

And, in the tenprint card selector 11, the card difference Dc has been determined to be a mere sum of the pattern level feature difference $D_{Pi}$, but when the tendency of reliability or the like by automatic judgment of the pattern level feature types on each finger is known statistically, the card difference Dc is expressed as follows:

Dc=$\Sigma a_i D_{Pi}$ ($a_i$=constant)

by using a calculating method of multiplying a weight which reflects the above tendency to obtain a load sum or a method of giving a value calculated by a function by entering N numbers of input, thereby capable of achieving the card selection excelling in reliability and selectivity.

Figure 4:
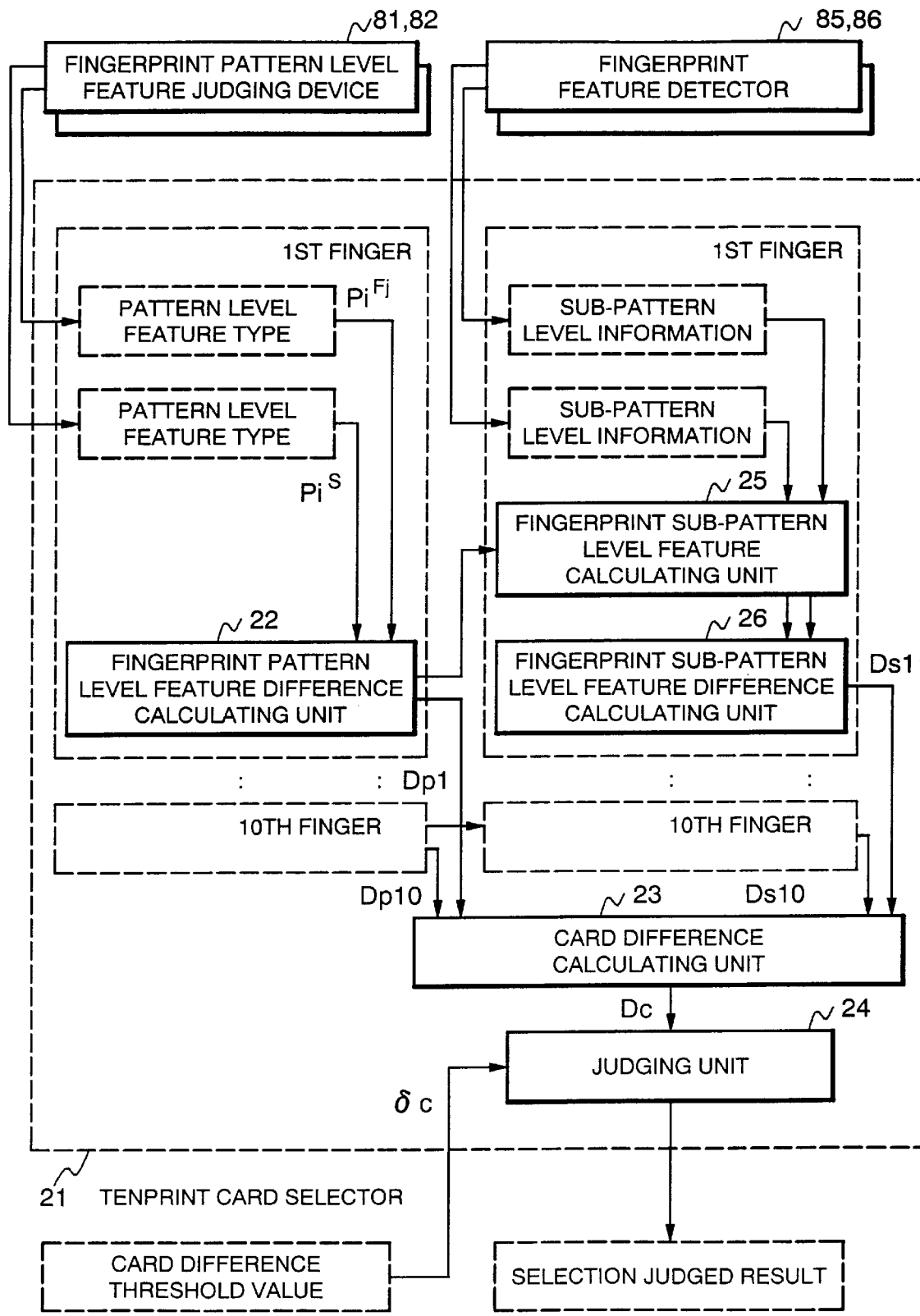
FIG. 4 is a block diagram showing a configuration of the tenprint card selector according to the second embodiment of the invention.
Figure 5:
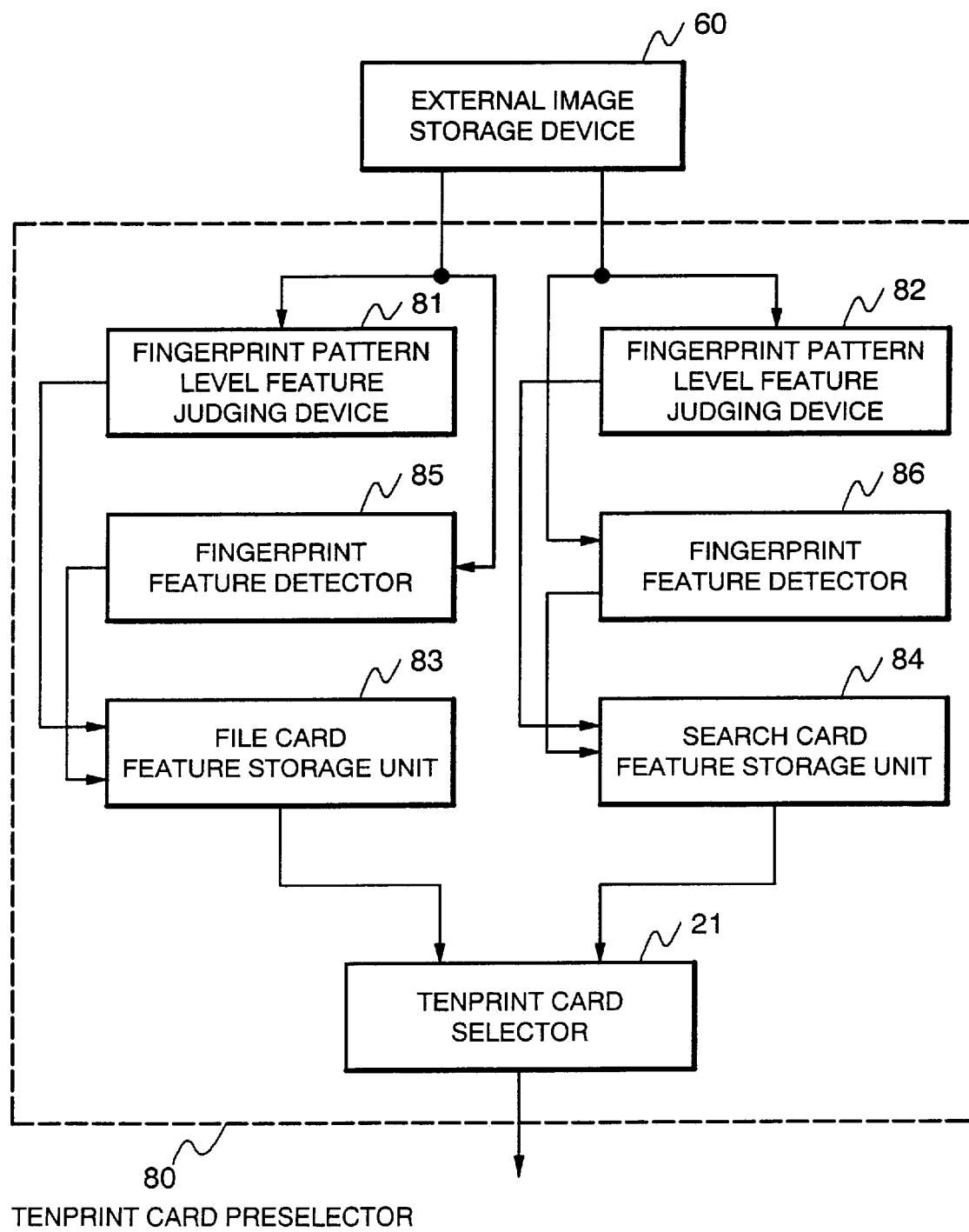
FIG. 5 is a block diagram showing a configuration of a tenprint card preselector provided with the tenprint card selector of the second embodiment.

FIG. 4 is a block diagram showing a configuration of the tenprint card selector according to the second embodiment of the invention. FIG. 5 is a block diagram showing a configuration of a tenprint card preselector provided with the tenprint card selector of the second embodiment shown in FIG. 4.

The following description will be made in the same way as in the first embodiment on the assumption that the tenprint cards which contain the file cards and the search card have the fingerprint images of ten fingers, and information on the N (=10) number of fingerprint images are used for selection and preselection. And, the number of the file cards placed in a file is determined to be M.

As shown in FIG. 4, a tenprint card selector 21 in the second embodiment comprises a fingerprint pattern level feature difference calculating unit 22 which receives a set of candidates for pattern level feature types of fingerprint images on file cards and a search card and determines a difference in the set of candidates for the pattern level features of each finger, a fingerprint sub-pattern level feature calculating unit 25 which receives sub-pattern level information of the fingerprint images on the file cards and the search card and determines fingerprint sub-pattern level features of respective fingers, a fingerprint sub-pattern level feature difference calculating unit 26 which determines a difference in fingerprint sub-pattern level feature of each finger based on the calculated results by the fingerprint sub-pattern level feature calculating unit 25, a card difference calculating unit 23 which determines the whole difference between the applicable file cards and the search card based on the calculated results by the fingerprint pattern level feature difference calculating unit 22 and the fingerprint sub-pattern level feature difference calculating unit 26, and a judging unit 24 for judging, whether or not the file cards shall be selected as the objects to be compared, based on the calculated results by the card difference calculating unit 23.

And, as shown in FIG. 5, a tenprint card preselector 80 provided with the tenprint card selector 21 comprises a fingerprint pattern level feature judging device 81 which receives the fingerprint images of respective fingers on the file cards and determines the set of candidates for pattern level feature types, a fingerprint feature detector 85 which receives the fingerprint images of the respective fingers on the file cards and obtains the sub-pattern level information, a fingerprint pattern level feature judging device 82 which receives the fingerprint images of the respective fingers on the search card and determines the set of candidates for pattern level feature types, a fingerprint feature detector 86 which receives the fingerprint images of the respective fingers on the search card and obtains the sub-pattern level information, a file card feature storage unit 83 which stores the set of candidates for the pattern level feature types of the respective fingers on the file cards which are the judged results by the fingerprint pattern level feature judging device 81 and the sub-pattern level information on the respective fingers on the file cards which are the judged results by the fingerprint feature detector 85, a search card feature storage unit 84 which stores the set of candidates for the pattern level feature types of the respective fingers on the search card which are the judged results by the fingerprint pattern level feature judging device 82 and the sub-pattern level information on the respective fingers on the search card which are the processed results by the fingerprint feature detector 86, and the tenprint card selector 21.

In the configuration of the second embodiment, the tenprint card selector 21 has a structure that the fingerprint pattern level feature difference calculating unit 22 and the judging unit 24 are configured in the same way as the fingerprint pattern level feature difference calculating unit 12 and the judging unit 14 of the tenprint card selector 11 of the first embodiment. And, in the configuration of the tenprint card preselector 80, the file card feature storage unit 83 and the search card feature storage unit 84 are the same as the fingerprint pattern level feature judging devices 71, 72, the file card feature storage unit 73 and the search card feature storage unit 74 in the tenprint card preselector 70 according to the first embodiment.

The fingerprint pattern level feature judging device 81 determines applicable pattern level feature types with respect to the fingerprint images of respective fingers collected on the file cards. The fingerprint pattern level feature judging device 82 determines applicable pattern level feature types with respect to the fingerprint images of respective fingers collected on the search card. As the fingerprint pattern level feature judging devices 81, 82, conventionally used various devices can be used as in the case of the fingerprint pattern level feature judging devices 71, 72 of the first embodiment.

The fingerprint feature detector 85 detects the sub-pattern level information on the applicable fingerprint images based on the fingerprint images of the respective fingers collected on the file cards. The fingerprint feature detector 86 detects the sub-pattern level information on the applicable fingerprint images based on the fingerprint images of the respective tive fingers collected on the search card. The sub-pattern level information detected by the fingerprint feature detectors 85, 86 contains types and position coordinates of singular points specified according to the pattern level features or the like of the fingerprint images. For example, when the fingerprint image is a loop, there are one core and one delta, and when it is a whorl, there are two cores and two deltas. Then, these are detected as the singular points, and their position coordinates are determined as the sub-pattern level information.

As the fingerprint feature detectors 85, 86, conventionally known various devices can be used. For example, the device described in Japanese Unexamined Patent Publication (Kokai) No. Heisei 5-108806 "Image Feature Detecting Method and Device Thereof" can be used. The fingerprint feature detectors 85, 86 of this embodiment which can be achieved by the image feature detector described in the above publication and other devices automatically detect the singular points such as cores and deltas on the fingerprint patterns and output their position coordinates as the sub-pattern level information as described above. If the singular points cannot be detected automatically because of poor image quality of a fingerprint image, the processed result is outputted as "unclassifiable".

The fingerprint sub-pattern level feature calculating unit 25 in the tenprint card selector 21 is achieved by a program-controlled CPU or the like, and as shown in FIG. 4, provided in a total number of N (=10) for each finger, and determines the sub-pattern level features of the fingerprint images of the file cards and the search card with respect to corresponded fingers. Specifically, the fingerprint sub-pattern level feature calculating unit 25 which is related to an i ($1<=i<=N$) finger, based on the sub-pattern level information on the i-the finger on the file card obtained from the fingerprint feature detector 85, the sub-pattern level information on the i-the finger on the search card obtained from the fingerprint feature detector 86, and the pattern level feature type $Pi^{Fj}$ of the file card of the i-the finger and the pattern level feature type $Pi^S$ of the search card obtained through the fingerprint pattern level feature difference calculating unit 22 corresponding to the i-th finger, determines a distance between respective singular points with respect to the sub-pattern level information on the file cards and the sub-pattern level information on the search card as the sub-pattern level feature of the applicable fingerprint image. For example, when the pattern level feature types $Pi^{Fj}$ and $Pi^S$ are loops, a distance between a single core and a single delta is calculated and determined as the sub-pattern level feature. And, when the pattern level feature types $Pi^{Fj}$ and $Pi^S$ are whorls, a group of six different distances between two cores and two deltas is determined as the sub-pattern level feature. And, in the processed results by the fingerprint feature detectors, if either of the sub-pattern level feature of the file card and the sub-pattern level information of the search card is determined "unclassifiable", the sub-pattern level feature is determined to be "unclassifiable".

The fingerprint sub-pattern level feature difference calculating unit 26 is achieved by a program-controlled CPU or the like, and as shown in FIG. 4, provided in a total number of N (=10) for each finger in pairs with the fingerprint sub-pattern level feature calculating unit 25 and compares the sub-patterns of the fingerprint images between the file cards and the search card determined by the fingerprint sub-pattern level feature calculating unit 25 with respect to respective related fingers.

Specifically, the fingerprint sub-pattern level feature difference calculating unit 26 related to the i-th ($1<=i<=N$)

finger compares the sub-pattern level feature of the fingerprint image of the i-th finger on the file card and the sub-pattern level feature of the fingerprint image of the i-th finger on the search card determined by the fingerprint sub-pattern level feature calculating unit 25, and calculates a sub-pattern level feature difference $D_{Si}$ (i=1, . . . , N). When the pattern level feature types of the fingerprint images on the file card and the search card are identical, the sub-pattern level feature difference $D_{Si}$ here has its value determined based on the positional difference or the like of singular points which are sub-pattern level features according to the applicable pattern level feature types.

For example, as to the i-th finger on the file card and the search card, when the pattern level feature types $Pi^{Fj}$ and $P^{iS}$ are loops and identical, the sub-pattern level feature difference $D_{Si}$ is calculated as "$D_{si}=K1'-L$", where "K1" is the absolute value of a difference between the core-to-delta distance of the file card and the core-to-delta distance of the search card, and "L" is a prescribed value.

And, when the pattern level feature types $Pi^{Fj}$ and $Pi^S$ are whorls and identical, the sub-pattern level feature difference $D_{Si}$ is calculated as "$D_{si}=V1-L$", where "V1" is average value of the absolute values of differences between six core-to-delta distances of the file card and six core-to-delta distances of the search card, and "L" is a prescribed value.

In other cases, a value "0" is determined as the sub-pattern level feature difference $D_{Si}$.

The prescribed value, which is deducted from a difference between singular point distances when the pattern level feature types $Pi^{Fj}$ and $Pi^S$ are loops or whorls and identical, can be determined as desired according to the accuracy or the like of the fingerprint image. For example, when an image has resolution of about 500 dpi, the prescribed value can be determined to be about 30. This prescribed value is deducted from the difference between the singular point distances because there is a possibility of causing a difference in distance of about the prescribed value due to circumstances of pressing fingers, errors of observation systems including the fingerprint feature detectors 85, 56 or the like even when the fingerprint image on the file card and the fingerprint image on the search card are taken from the same fingers, and therefore, such errors are allowed by the deduction. Specifically, while the sub-pattern level feature difference $D_{Si}$ is determined to be a value "0" because of short in information when the pattern level feature types $Pi^{Fj}$ and $Pi^S$ do not match, it is effective to give a "negative difference" (namely, "similarity score").

And, when the pattern level feature types $Pi^{Fj}$ and $Pi^S$ are whorls and identical, there are four singular points, and therefore, six distances between respective singular points when they are linked one another. But, it happens that four singular points are partly not detected in either of the file card or the search card and determined to be "unclassifiable". In such a case, it is impossible to determine all six distances between respective singular points. Therefore, it is determined that a distance is added to a line segment which can be obtained, and division is made by the number of this line segment.

The card difference calculating unit 23 is achieved by a program-controlled CPU or the like, and calculates the card difference Dc between the file card and the search card based on N numbers of pattern level feature differences $D_{Pi}$ outputted from the fingerprint pattern level feature difference calculating unit 22 and N numbers of sub-pattern level feature differences $D_{Si}$ outputted from the fingerprint sub-pattern level feature difference calculating unit 26. The card difference Dc is a sum of all the pattern level feature differences $D_{Pi}$ and the sub-pattern level feature difference $D_{Si}$, namely $\Sigma(D_{Pi}+D_{Si})$.

Now, the operation of the tenprint card selector 21 according to the second embodiment configured as described above will be described together with the operation of the tenprint card preselector 80 provided with the tenprint card selector 21. The process in this embodiment is mostly the same as the one in the first embodiment.

As the initial operation, in the tenprint card preselector 80, the fingerprint pattern level feature judging device 81 obtains the fingerprint images of N fingers shown on all the file cards (M numbers) stored in the external image storage device 60 or the like. And, the pattern level feature type $Pi^{Fj}$ is determined and stored in the file card feature storage unit 83. And, the fingerprint feature detector 85 obtains the fingerprint images of N fingers respectively shown on all the file cards stored in the external image storage device 60 or the like, determines sub-pattern level information, and stores in the file card feature storage unit 83.

When the fingerprint image of each finger on a given search card is given and a tenprint card having the identical fingerprint images is checked whether or not the file card data base has it, the fingerprint pattern level feature judging device 82 obtains the fingerprint image of each finger on the search card which is stored in the external image storage device 60 or the like and determines the pattern level feature type $Pi^S$. And, the set of candidates for the obtained pattern level feature type $Pi^S$ are stored in the search card feature storage unit 84. And, the fingerprint feature detector 86 obtains the fingerprint images of N fingers shown on the applicable search card stored in the external image storage device 60 or the like, to find sub-pattern level information, and stores in the file card feature storage unit 84. The search card feature storage unit 84 continuously sends the set of candidates for the applicable pattern level feature type $Pi^S$ to the tenprint card selector 21 while the matching process on the applicable search card is being performed.

In the tenprint card selector 21, the fingerprint pattern level feature difference calculating unit 22 compares the pattern level feature type $Pi^{Fj}$ on the file cards obtained from the fingerprint pattern level feature judging devices 81, 82 and the pattern level feature type $Pi^S$ on the search card, and if they are identical, and when at least either pattern level feature type is "unclassifiable", the value of the pattern level feature difference $D_{Pi}$ is determined to be "0". When the pattern level feature type $Pi^{Fj}$ of the file card and the pattern level feature type $Pi^S$ on the search card do not match, the value of the pattern level feature difference $D_{Pi}$ is determined to be "1". The above process is performed on each finger to determine the pattern level feature difference $D_{Pi}$ and to output to the card difference calculating unit 23. And, the fingerprint pattern level feature difference calculating unit 22 sends the pattern level feature types $Pi^{Fj}$ and $Pi^S$ of the file card and the search card obtained from the fingerprint pattern level feature judging devices 81, 82 to the fingerprint sub-pattern level feature calculating unit 25 corresponding to the same finger. In other words, the first finger-corresponding fingerprint pattern level feature difference calculating unit 22 sends the pattern level feature types P1Fj and P1S of the fingerprint image of the first finger to the first finger-corresponding sub-pattern level feature calculating unit 25.

The fingerprint sub-pattern level feature calculating unit 25 obtains a sub-pattern level feature based on sub-pattern level information of the file card and sub-pattern level information of the search card obtained from the fingerprint feature detectors 85, 86 and the pattern level feature types $Pi^{Fj}$ and $Pi^S$ obtained from the fingerprint pattern level feature difference calculating unit 22. When the processed result by the fingerprint feature detector is "unclassifiable", the sub-pattern level feature is determined to be "unclassifiable".

The fingerprint sub-pattern level feature difference calculating unit 26 determines the sub-pattern level feature difference $D_{Si}$ in connection with the corresponding i finger based on the sub-pattern level features of the file card and the search card.

For example, when the pattern level feature types $Pi^{Fj}$ and $Pi^S$ are loops and identical, the value of the sub-pattern level feature difference $D_{Si}$ is calculated as "$D_{Si}=K1-30$", where "K1" is the absolute value of a difference between the core-to-delta distance of the file card and the core-to-delta distance of the search card, "30" is a prescribed value (L=30).

When the pattern level feature types $Pi^{Fj}$ and $Pi^S$ are whorls and identical, the value of the sub-pattern level feature difference $D_{Si}$ is calculated as "$D_{Si}=V1-30$" where "V1" is average value (V1) of the absolute values of differences between six core-to-delta distances of the file card and six core-to-delta distances of the search card, "30" is a prescribed value (L=30).

In other cases, a value "0" is determined as the sub-pattern level feature difference $D_{Si}$. And, the sub-pattern level feature difference $D_{Si}$ obtained as described above is outputted to the card difference calculating unit 23.

As to all of the first finger to the Nth finger, the above process is performed by a pair of the fingerprint sub-pattern level feature calculating unit 25 and the fingerprint sub-pattern level feature difference calculating unit 26 which are mutually corresponded.

The card difference calculating unit 23 reads the pattern level feature difference $D_{Pi}$ obtained from the each finger-corresponding fingerprint pattern level feature difference calculating unit 22 and the sub-pattern level feature difference $D_{Si}$ obtained from the fingerprint sub-pattern level feature difference calculating unit 26 to determine the card difference Dc ($=\Sigma(D_{Pi}+D_{Si})$), and outputs to the judging unit 24.

The judging unit 24 compares the card difference Dc and the predetermined card difference threshold value δ c, and when the card difference Dc is larger than the card difference threshold value δ c, it is judged that comparison is not required, and the judged result on the applicable file card is determined to be "non-selection, and if not, it is judged that comparison is required, and the judged result on the applicable file card is determined to be "selection". The card difference threshold value δ c can be determined as desired according to the accuracy or the like of the tenprint card selecting unit required. And, in this operation example, it is determined according to whether or not the card difference Dc is larger than the card difference threshold value δ c, but it may be judged according to whether or not the card difference Dc is equal to or larger than the card difference threshold value δ c (containing the applicable card difference threshold value δ c).

In the above tenprint card selector 21, the position coordinates of the singular points such as cores and deltas are used as the sub-pattern level information, and the distance between the singular points is used as the sub-pattern level feature, but the sub-pattern level feature may be anything if it is in a characteristic volume obtainable from the fingerprint image. For example, the number of ridges which intersect the line segments connecting cores and deltas may be counted and used, and an angle formed by the line segment connecting cores and deltas and the straight line in the finger tip direction can be used. Besides, multiple features can be combined to form a sub-pattern level feature.

And, in the above tenprint card selector 21, the card difference Dc is determined to be a mere sum of the N number of pattern level feature difference $D_{Pi}$ and the N number of sub-pattern level feature difference $D_{Si}$, but it is assumed to make variations of calculating the weighed average of finger scores and changing a weight between the pattern level feature difference $D_{Pi}$ and the sub-pattern level feature difference $D_{Si}$. When generalized, for example, the card difference Dc can be expressed as follows:

$$Dc=\Sigma(f(a_i D_{Pi})+g(b_i D_{Si}))$$

where, f and g are a function, and $a_i$ and $b_i$ are a constant.

Figure 6:
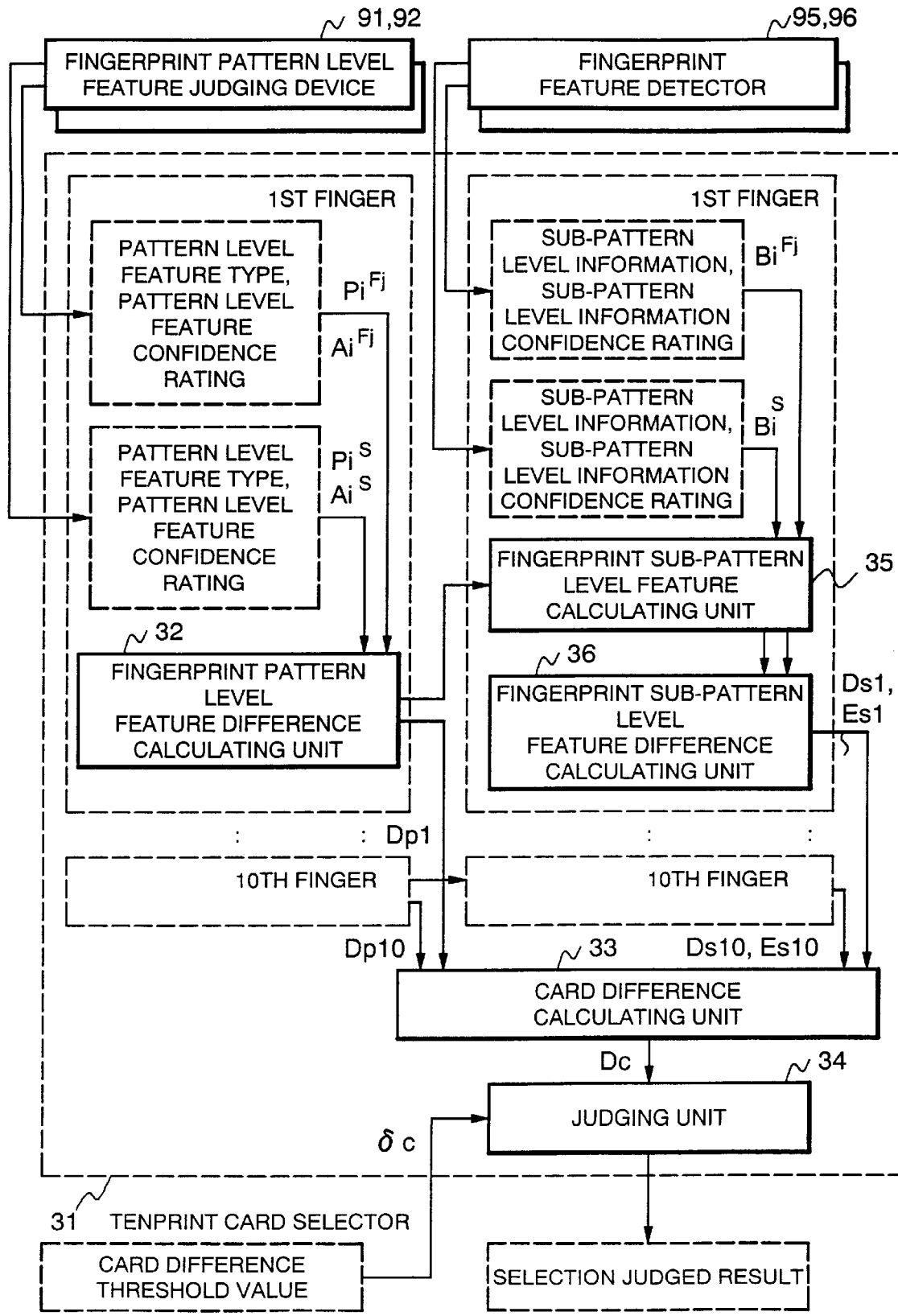
FIG. 6 is a block diagram showing a configuration of the tenprint card selector according to the third embodiment of the invention.
Figure 7:
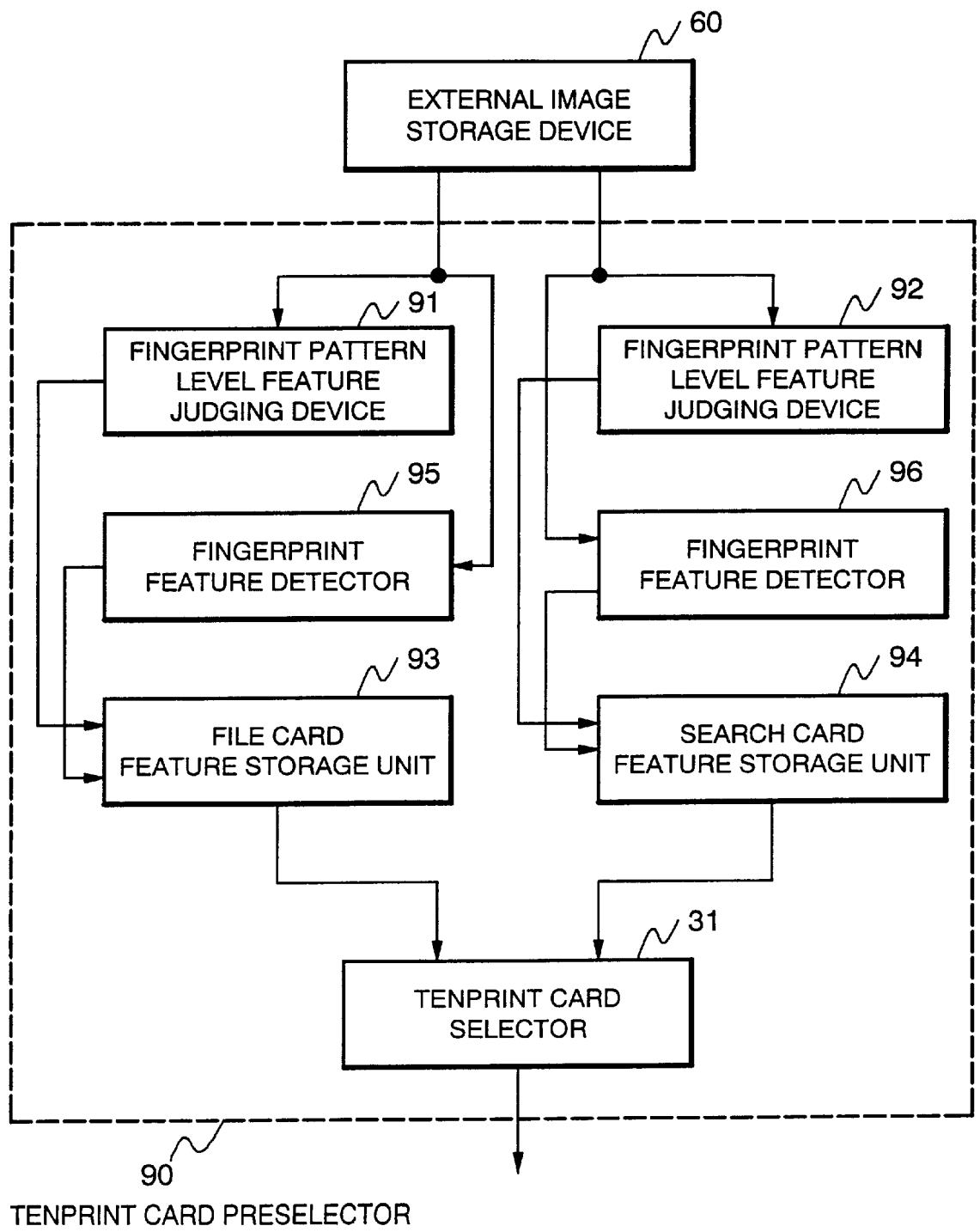
FIG. 7 is a block diagram showing a configuration of a tenprint card preselector provided with the tenprint card selector of the third embodiment.
Figure 8:
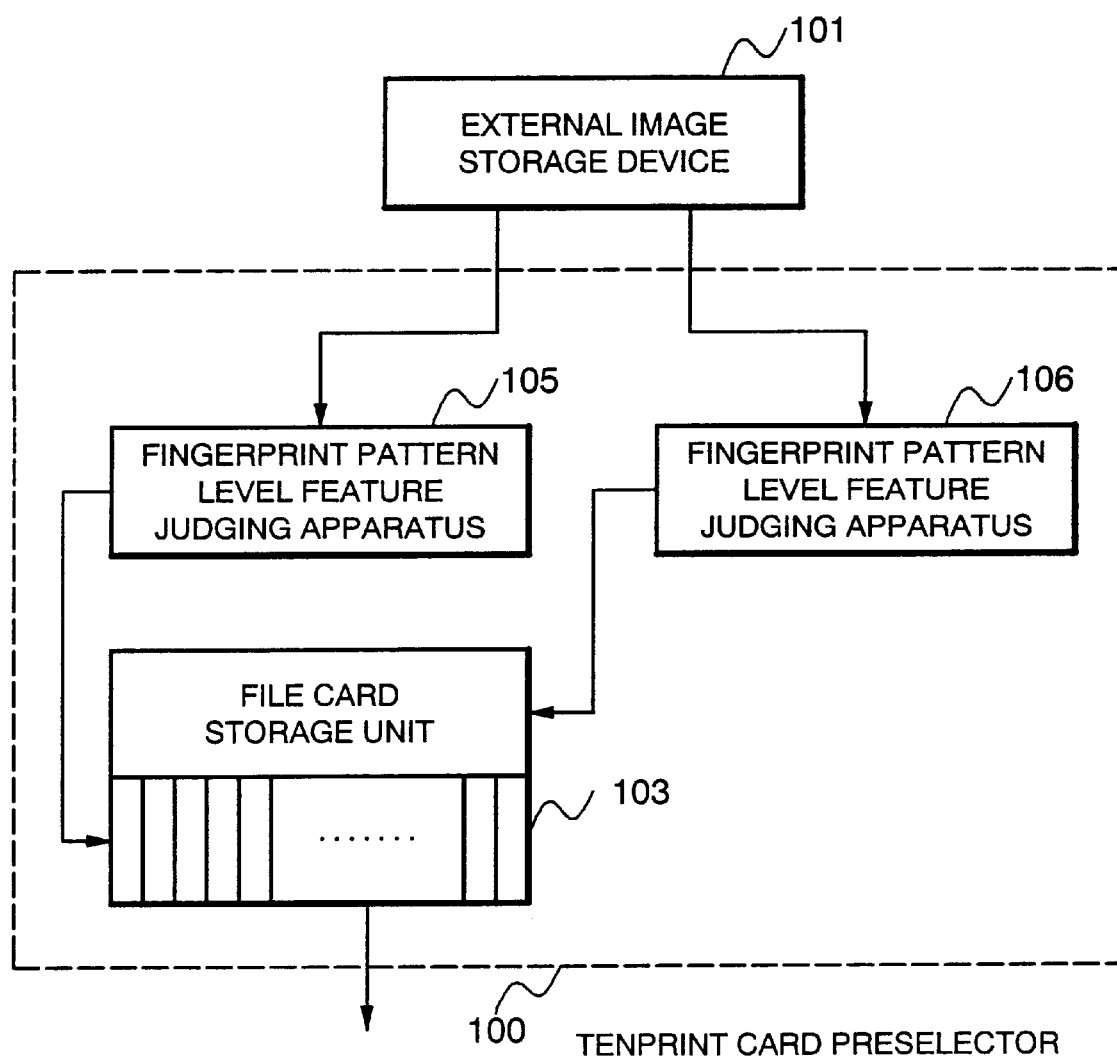
FIG. 8 is a block diagram showing the configuration of a conventional tenprint card preselector.

FIG. 6 is a block diagram showing a configuration of the tenprint card selector according to the third embodiment of the invention. FIG. 7 is a block diagram showing a configuration of the tenprint card preselector provided with the tenprint card selector according to the third embodiment shown in FIG. 6.

In the same way as in the above-described first embodiment, the tenprint cards containing the file cards and search card have fingerprint images of ten fingers, and information of N (=10) numbers of fingerprint images will be used for selection and preselection in the following description. And, it is assumed that the number of file cards in a file is M.

As shown in FIG. 6, a tenprint card selector 31 in the third embodiment comprises a fingerprint pattern level feature difference calculating unit 32 which receives a set of candidates for pattern level feature types of fingerprint images on file cards and a search card and determines a difference of the set of candidates for the pattern level features of respective fingers, a fingerprint sub-pattern level feature calculating unit 35 which receives sub-pattern level information of the fingerprint images on the file cards and the search card and determines the fingerprint sub-pattern level feature of each finger, a fingerprint sub-pattern level feature difference calculating unit 36 which determines a difference in fingerprint sub-pattern level feature of each finger based on the calculated results by the fingerprint sub-pattern level feature calculating unit 35, a card difference calculating unit 33 which determines the whole difference between the applicable file cards and the search card based on the calculated results by the fingerprint pattern level feature difference calculating unit 32 and the fingerprint sub-pattern level feature difference calculating unit 36, and a judging unit 34 for judging, whether or not the applicable file cards shall be selected as the objects to be compared, based on the calculated results by the card difference calculating unit 33. And, as shown in FIG. 5, a tenprint card preselector 90 provided with the tenprint card selector 31 comprises a fingerprint pattern level feature judging device 91 which receives the fingerprint images of respective fingers on the file cards and determines a set of candidates for pattern level feature types, a fingerprint feature detector 95 which receives the fingerprint images of the respective fingers on the file cards and obtains the sub-pattern level information, a fingerprint pattern level feature judging device 92 which receives the fingerprint images of the respective fingers on the search card and determines a set of candidates for pattern level feature types, a fingerprint feature detector 96 which receives the fingerprint images of the respective fingers on the search card and obtains the sub-pattern level information, a file card feature storage unit 93 which stores the set of candidates for the pattern level feature types of the respective fingers on the file cards which are the judged results by the fingerprint pattern level feature judging device 91 and the sub-pattern level information on the respective fingers on the file cards which are the judged results by the fingerprint feature detector 95, a search card feature storage unit 94 which stores the set of candidates for the pattern level feature types of the respective fingers on the search card which are the judged results by the fingerprint pattern level feature judging device 92 and the sub-pattern level information on the respective fingers on the search card which are the processed results by the fingerprint feature detector 96, and the tenprint card selector 31.

In the tenprint card selector 31 in the third embodiment, the fingerprint pattern level feature difference calculating unit 32, in addition to the pattern level feature types of the fingerprint images on the file cards and the search card, obtains a confidence rating (hereinafter referred to as the pattern level feature confidence rating) for the applicable pattern level feature types. And, the sub-pattern level feature calculating unit 35, in addition to the sub-pattern level information on the fingerprint images on the file cards and the search card, obtains a confidence rating (hereinafter referred to as the sub-pattern level information confidence rating) for the applicable sub-pattern level information.

The fingerprint pattern level feature judging device 91 detects the applicable pattern level feature types with respect to the fingerprint images of respective fingers collected on the file cards and the pattern level feature confidence rating about the applicable pattern level feature types. The fingerprint pattern level feature judging device 92 detects the applicable pattern level feature types with respect to the fingerprint images of respective fingers collected on the search card and the pattern level feature confidence rating about the applicable pattern level feature types. As the fingerprint pattern level feature judging devices 91, 92, conventionally used various devices can be used like the fingerprint pattern level feature judging devices 71, 72 used in the first embodiment.

As the pattern level feature confidence rating, a parameter may be determined as desired to insure the correctness of the pattern level feature types judged by the fingerprint pattern level feature judging devices 91, 92. For example, "posterior probability" described in the aforementioned Japanese Patent Application No. Heisei 7-197711 "Skin Pattern and Fingerprint Pattern Classifying Device" can be used. This is an error rate when pairs of sufficient and many file cards and search card to be used as certain learning data are previously classified and decided, and has values covering from "0" which does not assure the correctness of the pattern level feature types at all to "1" which shows the correctness of 100%. When the judged results on the pattern level feature types by the fingerprint pattern level feature judging devices 91, 92 are "unclassifiable", the pattern level feature confidence rating has a value "0".

The fingerprint feature detector 95 detects the sub-pattern level information on the applicable fingerprint images based on the fingerprint images of the respective fingers collected on the file cards and the sub-pattern level information confidence rating about the applicable sub-pattern level information. The fingerprint feature detector 96 detects the sub-pattern level information on the applicable fingerprint images based on the fingerprint images of the respective fingers collected on the search card and the sub-pattern level information confidence rating about the applicable sub-pattern level information. The detected sub-pattern level information and the sub-pattern level information confidence rating are sent to the sub-pattern level feature calculating unit 35 which is related to the respective fingers.

The sub-pattern level information confidence rating which is outputted together with the sub-pattern level information from the fingerprint feature detecting devices 95, 96 is determined as follows by utilizing the singular points which are sub-pattern level information.

First, the cores and the deltas on fingerprint patterns are detected, a ridge direction distribution f(h) of pattern level features at points on the perimeter with a given focal point as the center of such singular points is sampled by m, an inner product of the ridge direction distribution f(h) and a tangential vector at each point is determined, and a discrete Fourier expansion is made in the circumferential direction. Thus, the peak distribution of an inner circumference angle can be examined. When Fourier coefficient is used to determine a strength at each frequency component k, $P(k)=a_k^2+b_k^2$, from the following:

$a_k=(2/m) \Sigma f(h) \cos(2\pi kh/m)$, and $b_k=(2/m) \Sigma f(h) \sin(2\pi kh/m)$ (h=0, . . . , m−1)

the core has strength P(1) with a frequency component k=1 and the delta has strength P(3) with a frequency component k=3, respectively a value corresponding to the confidence rating for the respective singular points. Because, the core is the source from where the ridge flows out in one direction, and the flow intersects the circumference at right angles at one point on one round. Therefore, one inner product peak is produced. On the other hand, the delta is the source from where the ridge flows out in three directions, and the flow and the circumference are intersected at right angles at three points on one round. Therefore, three peaks are produced. Making Fourier conversion in the circumference direction in order to examine a strength of each frequency component corresponds to the examination of the number of peaks during one round. And, when the peak is one, the strength P(1) of the frequency component 1 becomes maximum, and when the peaks are three, the strength P(3) of the frequency component 3 becomes maximum. And, the magnitude of strength can be used as the confidence rating.

As to a pair of sufficient and many file cards and search card to be used as certain learning data, strength of each frequency component is previously determined, and the applicable strength is divided by its maximum value to normalize to 1. And, the obtained value is determined to be each sub-pattern level information confidence rating (If the input of a new fingerprint image results in a value exceeding this maximum value, the sub-pattern level information confidence rating concerning the sub-pattern level information of the applicable fingerprint image is determined to be "1"). Thus, when the detected singular point is correct in a range of from "0" to "1", a high sub-pattern level information confidence rating is obtained, and if not correct, a low sub-pattern level information confidence rating is obtained.

In the tenprint card selector 31, the fingerprint pattern level feature difference calculating unit 32 can be achieved by a program-controlled CPU or the like, and provided in a total number of N (=10) as shown in FIG. 6. And, as to the related fingers, the pattern level feature difference is obtained based on the pattern level features and the pattern level feature confidence rating of the fingerprint images on the file cards and the search card. Specifically, the fingerprint pattern level feature difference calculating unit 12 which is related to an i (1<=i<=N) finger first compares a pattern level feature type $Pi^{Fj}$ (i=1, . . . , N; j=1, . . . , M) of the fingerprint image of the i-th finger on the file card and a pattern level feature type $Pi^S$ of the fingerprint image of the i-th finger of the search card. And, when the pattern level feature type $Pi^{Fj}$ of the file card is identical to the pattern level feature type $Pi^S$ of the search card, a product $Ai^{Fi}Ai^S$ of a pattern level feature confidence rating $Ai^{Fj}$ of the file card and a pattern level feature confidence rating $Ai^S$ of the search card is determined, and a value $(-Ai^{Fj}Ai^S)$, which is the negative of the product, is determined to be a pattern level feature difference $D_{Pi}$. When the pattern level feature type $Pi^{Fj}$ of the file card does not match the pattern level feature type $Pi^S$ of the search card, the product $Ai^{Fj}Ai^S$ of the pattern level feature confidence rating $Ai^{Fj}$ of the file card and the pattern level feature confidence rating $Ai^S$ of the search card is determined as the pattern level feature difference $D_{Pi}$. And, at least either of the pattern level feature types is "unclassifiable", the value of the pattern level feature difference $D_{P1}$ is determined to be "0".

The fingerprint sub-pattern level feature calculating unit 35 is achieved by a program-controlled CPU or the like, and provided in a total number of N (=10) for each finger as shown in FIG. 6, and determines the sub-pattern level features and the sub-pattern level feature confidence rating concerning the applicable sub-pattern level feature of the fingerprint images of the file cards and the search card with respect to the related fingers. Specifically, the sub-pattern level feature calculating unit 35 which is related to an i (1<=i<=N) finger first determines the sub-pattern level feature comprising the distance between singular points in the same way as the fingerprint sub-pattern level feature calculating unit 25 of the above-described second embodiment. Then, according to the pattern level feature types of the file cards and the search card, sub-pattern level feature confidence ratings $C_{fi}$ and $C_{si}$ concerning the applicable sub-pattern level feature are determined based on sub-pattern level information confidence rating $Bi^{Fj}$ of the file card and sub-pattern level information confidence rating $Bi^S$. For example, when the pattern level feature types $Pi^{Fj}$ and $Pi^S$ are loops, a product of the sub-pattern level information confidence ratings $Bi^{Fj}$ of cores and deltas is determined to be the sub-pattern level feature $C_{fi}$ concerning the sub-pattern level feature of the file cards, and a product of the sub-pattern level information confidence ratings $Bi^S$ to be a sub-pattern confidence rating $C_{si}$. And, when the pattern level feature types $Pi^{Fj}$ and $Pi^S$ are whorls, a product of the sub-pattern level information confidence ratings $Bi^{Fj}$ of the respective points used in calculating six distances between singular points is determined to be the sub-pattern level feature confidence rating $C_{fi}$ concerning the sub-pattern level feature of the file cards, and a product of the sub-pattern level information confidence ratings $Bi^S$ to be the sub-pattern level feature confidence rating $C_{si}$. In either case, the values of the sub-pattern level feature confidence ratings $C_{fi}$ and $C_{si}$ are contained in a range of from "0" to "1". If the sub-pattern level feature cannot be calculated because either of the sub-pattern level features of the file cards and the sub-pattern level information of the search card is "unclassifiable" or the like, the values of the corresponding sub-pattern level feature confidence ratings $C_{fi}$ and $C_{si}$ are determined to be "0".

The fingerprint sub-pattern level feature difference calculating unit 36 is achieved by a program-controlled CPU or the like, and as shown in FIG. 6, provided in a total number of N (=10) for each finger in pairs with the fingerprint sub-pattern level feature calculating unit 35 and compares the sub-patterns level features of the fingerprint images between the file cards and the search card determined by the fingerprint sub-pattern level feature calculating unit 35 with respect to respective related fingers, thereby determining a sub-pattern level feature difference based on the sub-pattern level feature confidence rating. Specifically, the fingerprint sub-pattern level feature difference calculating unit 36 related to the i-th (1<=i<=N) finger compares the sub-pattern level feature of the fingerprint image of the i-th finger on the file cards and the sub-pattern level feature of the fingerprint image of the i-th finger on the search card which are determined by the fingerprint sub-pattern level feature calculating unit 35, and calculates a sub-pattern level feature difference $D_{Si}$ (i=1, . . . , N). The sub-pattern level feature difference $D_{Si}$ here has its value determined based on the positional difference or the like of singular points which is a sub-pattern level feature according to the applicable pattern level feature types and a product (hereinafter referred to as the sub-pattern level feature confidence rating product $E_{Si}$) of the sub-pattern level feature confidence rating $C_{fi}$ of the file card and the sub-pattern level feature confidence rating $C_{si}$ of the search card when the pattern level feature types of the fingerprint images on the file card and the search card are identical.

For example, as to the i-th finger on the file card and the search card, when the pattern level feature types $Pi^{Fj}$ and $Pi^S$ are loops and identical, the sub-pattern level feature difference $D_{Si}$ is calculated as "$D_{Si}=G1-L$", where G1 is a value obtained by multiplying the absolute value of a difference between the core-to-delta distance of the file card and the core-to-delta distance of the search card by the sub-pattern level feature confidence rating product $E_{si}$, and L is a prescribed value.

And, when the pattern level feature types $Pi^{Fj}$ and $Pi^S$ are whorls and identical, the sub-pattern level feature difference $D_{Si}$ is calculated as "$D_{Si}=V2-L$", where "V2" is follows based on average value obtained by multiplying the absolute values of differences between six core-to-delta distances of the file card and six core-to-delta distances of the search card by the sub-pattern level feature confidence rating product $E_{si}$, "L" is a prescribed value.

In other cases, the value "0" is determined as the sub-pattern level feature difference $D_{Si}$.

The prescribed value used in calculating the pattern level feature difference $D_{Si}$ is the same as the prescribed value used in calculating the pattern level feature difference $D_{Si}$ in the second embodiment. And, the sub-pattern level feature confidence rating product $E_{Si}$ is outputted together with the sub-pattern level feature difference $D_{Si}$ to the card difference calculating unit 33.

The card difference calculating unit 33 is achieved by a program-controlled CPU or the like, and determines a sum $\Sigma D_{Pi}$ of N numbers of pattern level feature differences $D_{Pi}$ outputted from the fingerprint pattern level feature difference calculating unit 32 and a value $\Sigma D_{Si}/\Sigma E_{Si}$ calculated based on a sum $\Sigma D_{Si}$ of the sub-pattern level feature difference $D_{Si}$ outputted from the fingerprint sub-pattern level feature difference calculating unit 36 and a sum $\Sigma E_{Si}$ of the sub-pattern level feature confidence rating product $E_{Si}$, and determines their sum $\Sigma D_{Pi}+\Sigma D_{Si}/\Sigma E_{Si}$ to make it a card difference Dc. Addition of $\Sigma D_{Si}/\Sigma E_{Pi}$ is equivalent to the calculation of a weighed average by the sub-pattern level feature confidence rating product $E_{Si}$ of the sub-pattern level feature difference $D_{Si}$ of each finger.

Now, the operation of the tenprint card selector 31 according to the third embodiment configured as described above will be described together with the operation of the tenprint card preselector 90 provided with the tenprint card selector 31. The process in this embodiment is mostly the same as the one described in the first embodiment.

As the initial operation, in the tenprint card preselector 90, the fingerprint pattern level feature judging device 91 obtains the fingerprint images of N fingers shown on all the file cards (M numbers) stored in the external image storage device 60 or the like. And, the pattern level feature types $Pi^{Fj}$ and the pattern level feature confidence rating $Ai^{Fj}$ are determined and stored in the file card feature storage unit 83. And, the fingerprint feature detector 85 obtains the fingerprint images of N fingers respectively shown on all the file cards stored in the external image storage device 60 or the like, determines sub-pattern level information and sub-pattern level information confidence rating $Bi^{Fj}$, and stores in the file card feature storage unit 83.

When the fingerprint images of respective fingers on a given search card are given and the file card data base is checked whether or not a tenprint card having the identical fingerprint images is contained therein, the fingerprint pattern level feature judging device 92 obtains the fingerprint images of respective fingers on the search card which is stored in the external image storage device 60 or the like and determines the pattern level feature type $Pi^S$ and the pattern level feature confidence rating $Ai^S$. And, the obtained pattern level feature type $Pi^S$ and pattern level feature confidence rating $Ai^S$ are stored in the search card feature storage unit 94. And, the fingerprint feature detector 96 obtains the fingerprint images of N fingers shown on the applicable search card stored in the external image storage device 60 or the like, to find sub-pattern level information and sub-pattern level information confidence rating $Bi^S$, and stores in the file card feature storage unit 94. The search card feature storage unit 94 continuously sends the applicable pattern level feature type $Pi^S$ and pattern level feature confidence rating $Ai^S$ to the tenprint card selector 21 while the matching process on the applicable search card is being performed.

In the tenprint card selector 31, the fingerprint pattern level feature difference calculating unit 32 compares the pattern level feature type $Pi^{Fj}$ on the file cards obtained from the fingerprint pattern level feature judging devices 91, 92 and the pattern level feature type $Pi^S$ on the search card, and if they are identical, the value of the pattern level feature difference $D_{Pi}$ is determined to be "$(-Ai^{Fj}Ai^S)$". When the pattern level feature type $Pi^{Fj}$ of the file card and the pattern level feature type $Pi^S$ on the search card do not match, the value of the pattern level feature difference $D_{Pi}$ is determined to be "$Ai^{Fj}Ai^S$". When at least either of the pattern level feature types is "unclassifiable", the value of the pattern level feature difference $D_{Pi}$ is determined to be "0". The above process is performed on each finger to determine the pattern level feature difference $D_{Pi}$ and to output to the card difference calculating unit 33. And, the fingerprint pattern level feature difference calculating unit 32 sends the pattern level feature types $Pi^{Fj}$ and $Pi^S$ and the pattern level feature confidence ratings $Ai^{Fj}$ and $Ai^S$ of the file card and the search card obtained from the fingerprint pattern level feature judging devices 91, 92 to the fingerprint sub-pattern level feature calculating unit 35 related to the same finger. In other words, the first finger-corresponding fingerprint pattern level feature difference calculating unit 32 sends the pattern level feature types P1Fj and P1S and the pattern level feature confidence ratings A1Fj and A1S of the fingerprint image of the first finger to the first finger-corresponding sub-pattern level feature calculating unit 35.

The fingerprint sub-pattern level feature calculating unit 35 obtains a sub-pattern level feature and sub-pattern level feature confidence ratings $C_{fi}$ and $C_{si}$ based on sub-pattern level information of the file card and the search card obtained from the fingerprint feature detectors 95, 96, the sub-pattern level information confidence ratings $Bi^{Fj}$ and $Bi^S$, the pattern level feature types $Pi^{Fj}$ and $Pi^S$ obtained from the fingerprint pattern level feature difference calculating unit 32, and the pattern level feature confidence ratings $Ai^{Fj}$ and $Ai^S$. When the processed result by the fingerprint feature detector is "unclassifiable", the sub-pattern level feature is determined to be "unclassifiable", and the values of the sub-pattern level feature confidence ratings $C_{fi}$ and $C_{si}$ are determined to be "0".

The fingerprint sub-pattern level feature difference calculating unit 26 determines the sub-pattern level feature difference $D_{Si}$ in connection with the related i finger based on the sub-pattern level features and sub-pattern level feature confidence ratings $C_{fi}$ and $C_{si}$ of the file card and the search card.

For example, when the pattern level feature types $Pi^{Fj}$ and $Pi^S$ are loops and identical, the value of the sub-pattern level feature difference $D_{Si}$ is calculated as "$D_{Si}=G1-30$", where "G1" is a value obtained by multiplying the absolute value of a difference between the core-to-delta distance of the file card and the core-to-delta distance of the search card by a sub-pattern level feature confidence rating product $E_{si}$, and "30" is a prescribed value (L=30).

When the pattern level feature types $Pi^{Fj}$ and $Pi^S$ are whorls and identical, the value of the sub-pattern level feature difference $D_{Si}$ is calculated as "$D_{Si}=V2-30$", where "V2" is average value obtained by multiplying the absolute values of differences between six core-to-delta distances of the file card and six core-to-delta distances of the search card by the sub-pattern level feature confidence rating product $E_{si}$, and "30" is a prescribed value (L=30).

In other cases, a value "0" is determined as the sub-pattern level feature difference $D_{Si}$. And, the sub-pattern level feature difference $D_{Si}$ obtained as described above is outputted to the card difference calculating unit 33.

As to all of the first finger to the Nth finger, the above process is performed by a pair of the sub-pattern level feature calculating unit 35 and the fingerprint sub-pattern level feature difference calculating unit 36 which are mutually related.

The card difference calculating unit 33 reads the pattern level feature difference $D_{Pi}$ obtained from the fingerprint pattern level feature difference calculating unit 32 and the sub-pattern level feature difference $D_{Si}$ and the sub-pattern level feature confidence rating product $E_{Si}$ outputted from the fingerprint sub-pattern level feature difference calculating unit 36 to determine the card difference Dc ($=\Sigma D_{Pi}+\Sigma D_{Si}/\Sigma E_{Si}$), and outputs it to the judging unit 34.

The judging unit 34 compares the card difference Dc and the predetermined card difference threshold value δ c, and when the card difference Dc is larger than the card difference threshold value δ c, it is judged that the comparison is not required, and the judged result on the applicable file card is determined to be "non-selection, and if not, it is judged that the comparison is required, and the judged result on the applicable file card is determined to be "selection". The card difference threshold value δ c can be determined as desired according to the required accuracy of the like of the tenprint card selecting unit. And, in this operation example, it is determined according to whether or not the card difference Dc is larger than the card difference threshold value δ c, but it may be judged according to whether or not the card difference Dc is equal to or larger than the card difference threshold value δ c (including the applicable difference threshold value δ c).

In the above tenprint card selector 31, the fingerprint pattern level feature difference calculating unit 32 uses the pattern level feature confidence rating $Ai^{Fj}$ of the file card and the pattern level feature confidence rating $Ai^S$ of the search card, their product $Ai^{Fj}Ai^S$ or the product code is reversed to a value, $-Ai^{Fj}Ai^S$, which is determined to be the pattern level feature difference $D_{Pi}$, which is not exclusive, but a nonlinear function f( ) may be used and a value which is determined by $f(Ai^{Fj}Ai^S)$ can be used.

And, in the above tenprint card selector 31, as pattern level information, the pattern level feature types $Pi^{Fj}$ and $Pi^S$ and their pattern level feature confidence ratings $Ai^{Fj}$ and $Ai^S$ are given solely, but like the tenprint card selector 11 in the first embodiment, the set of candidates for pattern level feature types $Pi^{Fj}$ and $Pi^S$ can be used to give the set for candidates for their respective corresponding pattern level feature confidence ratings $Ai^{Fj}$ and $Ai^S$. In this case, the judged result of the pattern level feature types becomes the set of candidates for a pair of the pattern level feature types $Pi^{Fj}$ and $Pi^S$ and the pattern level feature confidence ratings $Ai^{Fj}$ and $Ai^S$. When W stands for a whorl, L for a left loop, R for a right loop, and A for an arch, the form of ((W, 0.4) (L, 0.3) (A, 0.2) (R, 0.1)) is obtained for example. On the other hand, as to the common pattern level feature types $Pi^{Fj}$ and $Pi^S$, the fingerprint pattern level feature difference calculating unit 32 determines the pattern level feature confidence rating product $Ai^{Fj}Ai^S$ of the pattern level feature confidence ratings $Ai^{Fj}$ and $Ai^S$, the pattern level feature types $Pi^{Fj}$ and $Pi^S$ are determined to be "matching" when the pattern level feature confidence rating product $Ai^{Fj}Ai^S$ becomes maximum, and the pattern level feature difference $D_{Pi}$ is calculated from the pattern level feature confidence rating product $Ai^{Fj}Ai^S$.

Besides, in the above tenprint card selector 31, a distance between singular points is used as the sub-pattern level feature, but another feature can be used like the sub-pattern level feature in the second embodiment.

Furthermore, in the above tenprint card selector 31, the fingerprint sub-pattern level feature difference calculating unit 36, to determine a sub-pattern level feature difference, uses a difference of distances between singular points and the average value of the sub-pattern level feature confidence rating product $C_{fi}C_{si}$ of the sub-pattern level feature confidence ratings $C_{fi}$ and $C_{si}$, but this is not exclusive. For example, it is possible to use a method in that the threshold value of the sub-pattern level feature confidence ratings $C_{fi}$ and $C_{si}$ is determined and when either of the sub-pattern level feature confidence rating $C_{fi}$ or $C_{si}$ (or the sub-pattern level feature confidence rating product $C_{fi}C_{si}$) is smaller than the threshold value, it is not used.

Thus, the present invention has been described in the form of three preferred embodiments, but various modifications can be made without departing from the technical scope of the present invention. For example, in the tenprint card selectors 11, 21, 31 in the three embodiments described above, the fingerprint pattern level feature difference calculating units 12, 22 and 32, the fingerprint sub-pattern level feature calculating units 25 and 35, and the fingerprint sub-pattern level feature difference calculating units 26 and 36 are provided in multiple numbers (N) to independently relate to each finger. But, instead of providing them in multiple members to correspond to each finger, it is also possible to provide each common calculating unit to sequentially calculate concerning each finger.

And, in the tenprint card preselectors 80 and 90 in the embodiments described above, the fingerprint sub-pattern level feature calculating units 25 and 35 are respectively placed in the tenprint card selectors 21 and 31, but can be placed in the fingerprint feature detectors 85, 86 and 95, 96, respectively.

In each embodiment, N is determined to be 10 and the fingerprint images of all ten fingers are used to preselect a tenprint card. But, the tenprint card (particularly, the search card) is not always required to collect the fingerprint image of all ten fingers, and N can be variable from 1 to 10 according to the number of fingerprints collected. Specifically, if the collected fingerprint could be identified to be which finger, only the fingerprint image of the applicable finger can be used to preselect the file cards. In this case, the card difference threshold value δ c is adjusted, or the method for calculating the pattern level feature difference $D_{Pi}$, sub-pattern level feature difference $D_{Si}$ and card difference Dc can be appropriately modified, so that preselection with relatively high accuracy can be achieved.

And, in judging the set of the pattern level feature types $Pi^{Fj}$ and $Pi^S$ of N fingers, if judgment cannot be made or the judged result becomes so ambiguous that a plurality of pattern level feature types are determined as the applicable candidates, the fingerprint pattern level feature difference calculating units 12, 22 and 32 can calculate to allow ambiguity, so that selection and preselection with higher reliability and selectivity can be achieved.

And, by using sub-pattern level information at the same time, a feature space dimension is increased to expand the feature space, so that selection and preselection with higher reliability and selectivity can be made.

Besides, by considering the pattern level feature confidence ratings $Ai^{Fj}$ and $Ai^S$ and the sub-pattern level information confidence ratings $Bi^{Fj}$ and $Bi^S$ which are related to the pattern level feature types $Pi^{Fj}$ and $Pi^S$ and sub-pattern level information, the card difference Dc weighed according to the pattern level feature confidence ratings $Ai^{Fj}$ and $Ai^S$ and the sub-pattern level information confidence ratings $Bi^{Fj}$ and $Bi^S$ can be calculated, and reliability and selectivity can be enhanced further.

As described above, by the tenprint card selector and the tenprint card preselector according to the present invention, the fingerprint pattern level feature difference and the card difference are calculated, and according to the obtained results, the file cards which are to be compared with the search card are selected, and as to a plurality of fingerprint images on the file cards and the search card, in order to judge the pattern level feature types and to detect singular points on the fingerprint images, they are allowed to have possibilities that judgment cannot be made or erroneous judgment may be made, and reliability and selectivity for preselecting the file cards to be checked can be enhanced.

And, the tenprint card selector and the tenprint card preselector have effects of having flexibility to achieve the preselecting process which has desired properties and performance according to a tradeoff of two yardsticks, reliability and selectivity.

Besides, the tenprint card selector and the tenprint card preselector of the present invention have effects of expanding the feature space and enabling the selection of higher reliability and selectivity by calculating the fingerprint sub-pattern level feature and the fingerprint sub-pattern level feature difference based on the sub-pattern level information of the fingerprint images in addition to the fingerprint pattern level feature difference, and by selecting the file cards which are compared with the search card by calculating the card difference based on the above calculation.

Furthermore, the tenprint card selector and the tenprint card preselector of the present invention have effects of enabling to calculate the card difference weighed according to the pattern level feature confidence rating and the sub-pattern level information confidence rating and to further enhance reliability and selectivity by calculating the card difference considering the pattern level feature confidence rating and the sub-pattern level information confidence rating concerning the pattern level feature types and the sub-pattern level information in addition to the fingerprint pattern level feature difference, fingerprint sub-pattern level feature and fingerprint sub-pattern level feature difference.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A tenprint card selector for selecting tenprint cards, which have features similar to those of a sample, from a file having a plurality of tenprint cards, comprising:

a fingerprint pattern level feature difference calculating means for receiving and comparing a set of candidates for pattern level feature types of fingerprint images shown on file cards and a set of candidates for pattern level feature types of fingerprint images shown on a search card and calculates a pattern level feature difference which shows the degree of similarity between the sets of candidates;

a card difference calculating means for calculating a card difference showing similarity of the features of the fingerprint images shown on said file cards and said search card based on said pattern level feature difference of the fingerprint images of all fingers shown on said file cards and said search card; and a judging means for comparing the card difference determined by said card difference calculating means with a predetermined card difference threshold value and judging whether said file card shall be selected to be further checked with said search card, wherein when the comparison of the sets of candidates for the pattern level feature types of said file cards and said search card results in that both sets of candidates are similar or at least either of the pattern level feature types is unclassifiable, that the sets of candidates do not have any common pattern level feature type, or that a plurality of candidates in the sets of candidates have the same pattern level feature types, said fingerprint pattern level feature difference calculating means determines the value of the pattern level feature difference to respectively be a minimum value, a maximum value, and a value appropriately determined between said minimum and maximum values, and wherein said card difference calculating means determines a sum of all the pattern level feature differences of the respective fingers calculated by said fingerprint pattern level feature difference calculating means as the card difference.

2. A tenprint card selector for selecting tenprint cards, which have features similar to those of a sample, from a file having a plurality of tenprint cards, comprising:

a fingerprint pattern level feature difference calculating means for receiving and comparing pattern level feature types of fingerprint images shown on file cards and pattern level feature types of fingerprint images shown on a search card and calculates a pattern level feature difference to show whether or not said pattern level feature types are identical mutually;

a fingerprint sub-pattern level feature calculating means for receiving sub-pattern level information on the fingerprint images shown on said file cards and sub-pattern level information on the fingerprint images shown on said search card and calculating a sub-pattern level feature showing secondary features of said fingerprint images;

a fingerprint sub-pattern level feature difference calculating means for receiving and comparing the sub-pattern level feature of the file cards and the sub-pattern level features of the search card determined by said sub-pattern level feature calculating means and also receiving and referring to the pattern level feature types of the fingerprint images shown on said file cards and said search card, and calculating a sub-pattern level feature difference which shows the degree of similarity between said sub-pattern level features;

a card difference calculating means for calculating a card difference showing similarity of the features of the fingerprint images shown on said file cards and said search card based on said pattern level feature difference of the fingerprint images of all fingers shown on said file cards and said search card and said sub-pattern level feature difference of the fingerprint images of all fingers shown on said file cards and said search card; and a judging means for comparing the card difference determined by said card difference calculating means with a predetermined card difference threshold value and judging whether said file card shall be selected to be further checked with said search card.

3. The tenprint card selector as set forth in claim 2, wherein said fingerprint pattern level feature difference calculating means is provided in multiple numbers to individually relate to each finger and calculates a pattern level feature difference with respect to the fingerprint image of each related finger, said fingerprint sub-pattern level feature calculating means is provided in multiple numbers to individually relate to each finger and calculates a sub-pattern level feature with respect to the fingerprint image of each related finger, and said fingerprint sub-pattern level feature difference calculating means is provided in multiple numbers to individually relate to each finger and calculates a sub-pattern level feature difference with respect to the fingerprint image of each related finger.

4. The tenprint card selector as set forth in claim 2, wherein when the comparison of the pattern level feature types of said file cards and said search card results in that both pattern level feature types are same or at least either of the pattern level feature types is unclassifiable, or that the pattern level feature types do not match, said fingerprint pattern level feature difference calculating means determines the value of the pattern level feature difference to be a minimum value, or a maximum value, said fingerprint sub-pattern level feature calculating means receives said sub-pattern level information containing position coordinates of the singular points in the fingerprint images on said file cards and said search card to calculate a distance between said singular points and determines it as the sub-pattern level feature, when the pattern level feature types of the fingerprint images on said file cards and the pattern level feature types of the fingerprint images on said search card are identical, said fingerprint sub-pattern level feature difference calculating means calculates said sub-pattern level feature difference based on the positional difference of the singular points which are sub-pattern level features according to a calculating formula determined according to said pattern level feature types, and said card difference calculating means determines a sum obtained by adding all the pattern level feature differences of the respective fingers calculated by said fingerprint pattern level feature difference calculating means and the sub-pattern level feature differences of the respective fingers obtained by said fingerprint sub-pattern level feature difference calculating means as the card difference.

5. The tenprint card selector as set forth in claim 2, wherein when the comparison of the pattern level feature types of said file cards and said search card results in that both pattern level feature types are same or at least either of the pattern level feature types is unclassifiable, or that the pattern level feature types do not match, said fingerprint pattern level feature difference calculating means determines the value of the pattern level feature difference to be a minimum value, or a maximum value, said fingerprint sub-pattern level feature calculating means receives said sub-pattern level information containing position coordinates of the singular points on the fingerprint images of said file cards and said search card to calculate a distance between said singular points and determines it as the sub-pattern level feature, when the pattern level feature types of the fingerprint images on said file cards and the pattern level feature types of the fingerprint images on said search card are loops and identical, whorls and identical, or others, said fingerprint sub-pattern level feature difference calculating means determines (the absolute value of a difference between the core-to-delta distance of the file card and the core-to-delta distance of the search card—prescribed value), (average value of the absolute values of differences between six core-to-delta distances of the file cards and six core-to-delta distances of the search card—prescribed value), or a value "0" as the sub-pattern difference, and said card difference calculating means determines a sum obtained by adding all the pattern level feature differences of the respective fingers calculated by said fingerprint pattern level feature difference calculating means and the sub-pattern level feature differences of the respective fingers obtained by said fingerprint sub-pattern level feature difference calculating means as the card difference.

6. The tenprint card selector as set forth in claim 2, wherein said fingerprint pattern level feature difference calculating means receives the pattern level feature types of the fingerprint images of said file cards and said search card and receives the pattern level feature confidence rating to insure the correctness of the pattern level feature types of the fingerprint images of said file cards and said search card, and determines a product of a pattern level feature confidence rating of the fingerprint images of said file cards and a pattern level feature confidence rating of the fingerprint images of said search card as a magnitude and a value with its code reversed as the pattern level feature difference when the pattern level feature types of the fingerprint images of said file cards and the pattern level feature types of the fingerprint images of said search card are identical, determines a product of a pattern level feature confidence rating of the fingerprint images of said file cards and a pattern level feature confidence rating of the fingerprint images of said search card as the pattern level feature difference when the pattern level feature types of the fingerprint images of said file cards and the pattern level feature types of the fingerprint images of said search card do not match, and determines the value "0" as the pattern level feature difference when at least either of the pattern level feature types is unclassifiable;

said fingerprint sub-pattern calculating means receives said sub-pattern level information containing position coordinates of the singular points on the fingerprint images of said file cards and said search card, and also receives the pattern level feature types of the fingerprint images of said file cards and said search card and the sub-pattern level information confidence rating to insure the correctness of the sub-pattern level information concerning the fingerprint images of said file cards and said search card, and calculates said distance between singular points to determine as the sub-pattern level feature and calculates a sub-pattern level feature confidence rating product by multiplying the sub-pattern level information confidence rating concerning the singular points used to calculate said sub-pattern level feature;

said fingerprint sub-pattern level feature difference calculating means, when the pattern level feature types of the fingerprint images on said file cards and the pattern level feature types of the fingerprint images on the search card are loops and identical, whorls and identical, or others, determines (a value obtained by multiplying the absolute value of a difference between the core-to-delta distance of the file cards and the core-to-delta distance of the search card by a sub-pattern level feature confidence rating product—prescribed value), (average value obtained by multiplying the absolute values of differences between six core-to-delta distances of the file cards and six core-to-delta distances of the search card by the sub-pattern level feature confidence rating product—prescribed value), or a value "0" as the sub-pattern level feature difference; and said card difference calculating means calculates a first calculation value which is a sum of the pattern level feature differences of the respective fingers obtained by said fingerprint pattern level feature difference calculating means and a second calculation value which is a quotient obtained by dividing a sum of the sub-pattern level feature differences of the respective fingers obtained by said fingerprint sub-pattern level feature difference calculating means by a sum of the sub-pattern level feature confidence rating products of the respective fingers obtained by said fingerprint sub-pattern level feature difference calculating means, and determines a sum of said first calculation value and said second calculation value as the card difference.

7. A tenprint card preselector for preselecting tenprint cards which are to be compared by selecting the tenprint cards having features similar to those of a sample from a file containing a plurality of tenprint cards before matching fingerprints by using tenprint cards, comprising:

a first fingerprint pattern level judging means for detecting the candidates for pattern level feature types which are applicable to fingerprint images of respective fingers collected on file cards and producing a set of candidates;

a second fingerprint pattern level judging means for detecting the candidates for pattern level feature types which are applicable to fingerprint images of respective fingers collected on a search card and producing a set of candidates;

a tenprint card selecting means for receiving the set of candidates for the pattern level feature types for one card each from said first fingerprint pattern level feature judging means and said second fingerprint pattern level judging means and selecting the file cards which are to be compared with the search card;

said tenprint card selecting means comprising:

a fingerprint pattern level feature difference calculating means for receiving and comparing a set of candidates for pattern level feature types of fingerprint images on said file cards produced by said first fingerprint pattern level feature judging means and a set of candidates for pattern level feature types of fingerprint images on said search card produced by said second fingerprint pattern level feature judging means and calculating a pattern level feature difference to show the degree of similarity between the sets of candidates, a card difference calculating means for calculating a card difference showing similarity of the features of the fingerprint images shown on said file cards and said search card based on said pattern level feature difference of the fingerprint images of all fingers shown on said file cards and said search card, and a judging means for comparing the card difference determined by said card difference calculating means with a predetermined card difference threshold value and judging whether said file card shall be selected to be further checked with said search card, wherein when the comparison of the sets of candidates for the pattern level feature types of said file cards and said search card results in that both sets of candidates are similar or at least either of the pattern level feature types is unidentified, that the sets of candidates do not have any common pattern level feature type, or that a plurality of candidates in the sets of candidates have the same pattern level feature types, said fingerprint pattern level feature difference calculating means determines the value of the pattern level feature difference to respectively be a minimum value, a maximum value, and a value appropriately determined between said minimum and maximum values, and wherein said card difference calculating means determines a sum of all the pattern level feature differences of the respective fingers calculated by said fingerprint pattern level feature difference calculating means as the card difference.

8. A tenprint card preselector for preselecting tenprint cards which are to be compared by selecting the ten pin cards having features similar to those of a sample from a file containing a plurality of tenprint cards before matching fingerprints by using the tenprint cards, comprising:

a first fingerprint pattern level feature judging means for judging applicable pattern level feature types with respect to fingerprint images of respective fingers collected on file cards;

a first sub-pattern level feature detecting means for detecting sub-pattern level information of said fingerprint images based on the fingerprint images of respective fingers collected on said file cards, a second fingerprint pattern level feature judging means for detecting candidates for applicable pattern level feature types with respect to fingerprint images of respective fingers collected on a search card and producing a set of candidates, a second sub-pattern level feature detecting means for detecting sub-pattern level information of said fingerprint images based on the fingerprint images of respective fingers collected on said search card; and a tenprint card selecting means for receiving the set of candidates for the pattern level feature types for one card each from said first fingerprint pattern level feature judging means and said second fingerprint pattern level feature judging means, receiving said sub-pattern level information of tenprint cards corresponding to the set of candidates received from said first sub-pattern level feature detecting means and said second sub-pattern level feature detecting means, and selecting the file cards which are to be compared with the search card;

said tenprint card selecting means comprising:

a fingerprint pattern level feature difference calculating means for receiving and comparing pattern level feature types of fingerprint images on said file cards judged by said first fingerprint pattern level feature judging means and pattern level feature types of fingerprint images on said search card judged by said second fingerprint pattern level feature judging means and calculating a pattern level feature difference to show whether or not said pattern level feature types are identical mutually, a fingerprint sub-pattern level feature calculating means for receiving sub-pattern level information on the fingerprint images shown on said file cards and sub-pattern level information on the fingerprint images shown on said search card and calculating a sub-pattern level feature showing secondary features of said fingerprint images, a fingerprint sub-pattern level feature difference calculating means for receiving and comparing the sub-pattern level feature of the file cards and the sub-pattern level feature of the search card determined by said fingerprint sub-pattern level feature calculating means and also receiving and referring to the pattern level feature types of the fingerprint images shown on said file cards and said search card, and calculating a sub-pattern level feature difference which shows the degree of similarity between said sub-pattern level features mutually, a card difference calculating means for calculating a card difference showing similarity of the features of the fingerprint images shown on said file cards and said search card based on said pattern level feature difference of the fingerprint images of all fingers shown on said file cards and said search card and said sub-pattern level feature difference of the fingerprint images of all fingers shown on said file cards and said search card, and a judging means for comparing the card difference determined by said card difference calculating means with a predetermined card difference threshold value and judging whether said file card shall be selected to be further checked with said search card.

9. The tenprint card preselector as set forth in claim 8, wherein when the comparison of the pattern level feature types of said file cards and said search card results in that both pattern level feature types are identical or at least either of the pattern level feature types is unclassifiable, or that the pattern level feature types do not match, said fingerprint pattern level feature difference calculating means determines the value of the pattern level feature difference to be a minimum value, or a maximum value, said fingerprint sub-pattern level feature calculating means receives said sub-pattern level information containing a position coordinate of the singular points on the fingerprint images of said file cards and said search card to calculate a distance between said singular points and determines it as the sub-pattern level feature, when the pattern level feature types of the fingerprint images on said file cards and the pattern level feature types of the fingerprint images on the search card are identical, said fingerprint sub-pattern level feature difference calculating means calculates said sub-pattern level feature difference based on the positional difference of singular points which are sub-pattern level features according to a calculating formula determined according to said pattern level feature types, and said card difference calculating means determines a sum obtained by adding all the pattern level feature differences of the respective fingers calculated by said fingerprint pattern level feature difference calculating means and the sub-pattern level feature differences of the respective fingers obtained by said fingerprint sub-pattern level feature difference calculating means as the card difference.

10. The tenprint card preselector as set forth in claim 8, wherein when the comparison of the pattern level feature types of said file cards and said search card results in that both pattern level feature types are identical or at least either of the pattern level feature types is unclassifiable, or that the pattern level feature types do not match, said fingerprint pattern level feature difference calculating means determines the value of the pattern level feature difference to be a minimum value, or a maximum value, said fingerprint sub-pattern level feature calculating means receives said sub-pattern level information containing a position coordinate of the singular points on the fingerprint images of said file cards and said search card to calculate a distance between said singular points and determines it as the sub-pattern level feature, when the pattern level feature types of the fingerprint images on said file cards and the pattern level feature types of the fingerprint images on the search card are loops and identical, whorls and identical, or others, said fingerprint pattern level feature difference calculating means determines (the absolute value of a difference between the core-to-delta distance of the file cards and the core-to-delta distance of the search card—prescribed value), (average value of the absolute values of differences between six core-to-delta distances of the file cards and six core-to-delta distances of the search card—prescribed value), or a value "0" as the sub-pattern level feature difference, and said card difference calculating means determines a sum obtained by adding all the pattern level feature differences of the respective fingers calculated by said fingerprint pattern level feature difference calculating means and the sub-pattern level feature differences of the respective fingers obtained by said fingerprint sub-pattern level feature difference calculating means as the card difference.

11. The tenprint card preselector as set forth in claim 8, wherein said fingerprint pattern level feature difference calculating means receives the pattern level feature types of the fingerprint images of said file cards and said search card and receives the pattern level feature confidence rating to insure the correctness of the pattern level feature types of the fingerprint images of said file cards and said search card, and determines a product of −1, a pattern level feature confidence rating of the fingerprint images of said file cards and a pattern level feature confidence rating of the fingerprint images of said search card as the pattern level feature difference when the pattern level feature types of the fingerprint images of said file cards and the pattern level feature types of the fingerprint images of said search card are identical, determines a product of a pattern level feature confidence rating of the fingerprint images of said file cards and a pattern level feature confidence rating of the fingerprint images of said search card as the pattern level feature difference when the pattern level feature types of the fingerprint images of said file cards and the pattern level feature types of the fingerprint images of said search card do not match, and determines the value "0" as the pattern level feature difference when at least either of the pattern level feature types is unclassifiable;

said fingerprint sub-pattern calculating means receives said sub-pattern level information containing position coordinates of the singular points on the fingerprint images of said file cards and said search card, and also receives the pattern level feature types of the fingerprint images of said file cards and said search card and the sub-pattern level information confidence rating to insure the correctness of the sub-pattern level information concerning the fingerprint images of said file cards and said search card, and calculates said distance between singular points to determine as the sub-pattern level feature and calculates a sub-pattern level feature confidence rating product by multiplying the sub-pattern level information confidence rating concerning the singular points used to calculate said sub-pattern level feature;

said fingerprint sub-pattern level feature difference calculating means, when the pattern level feature types of the fingerprint images on said file cards and the pattern level feature types of the fingerprint images on the search card are loops and identical, whorls and identical, or others, determines (a value obtained by multiplying the absolute value of a difference between the core-to-delta distance of the file cards and the core-to-delta distance of the search card by a sub-pattern level feature confidence rating product—prescribed value), (average value obtained by multiplying the absolute values of differences between six core-to-delta distances of the file cards and six core-to-delta distances of the search card by the sub-pattern level feature confidence rating product—prescribed value), or a value "0" as the sub-pattern level feature difference; and said card difference calculating means calculates a first calculation value which is a sum of the pattern level feature differences of the respective fingers obtained by said fingerprint pattern level feature difference calculating means and a second calculation value which is a quotient obtained by dividing a sum of the sub-pattern level feature differences of the respective fingers obtained by said fingerprint sub-pattern level feature difference calculating means by a sum of the sub-pattern level feature confidence rating products of the respective fingers obtained by said fingerprint sub-pattern level feature difference calculating means, and determines a sum of said first calculation value and said second calculation value as the card difference.

12. The tenprint card selector as set forth in claim 2, wherein the card difference calculating unit calculates the card difference Dc according to $Dc=(f(a_i D_{pi})+g(b_i D_{si})$, wherein f and g are functions, $a_i$ and $b_i$ are constants, $D_{pi}$ corresponds to said pattern level feature difference, and $D_{si}$ corresponds to said sub-pattern level feature difference.

* * * * *